United States Patent
Morita et al.

(10) Patent No.: US 12,147,077 B2
(45) Date of Patent: Nov. 19, 2024

(54) OPTICAL MODULE, ADJUSTMENT DEVICE, AND ADJUSTMENT METHOD

(71) Applicant: SONY GROUP CORPORATION, Tokyo (JP)

(72) Inventors: Hiroshi Morita, Kanagawa (JP); Kazuaki Toba, Kanagawa (JP); Masanari Yamamoto, Kanagawa (JP)

(73) Assignee: SONY GROUP CORPORATION, Tokyo (JP)

(*) Notice: Subject to any disclaimer, the term of this patent is extended or adjusted under 35 U.S.C. 154(b) by 259 days.

(21) Appl. No.: 17/774,109

(22) PCT Filed: Nov. 10, 2020

(86) PCT No.: PCT/JP2020/041799
§ 371 (c)(1),
(2) Date: May 3, 2022

(87) PCT Pub. No.: WO2021/095702
PCT Pub. Date: May 20, 2021

(65) Prior Publication Data
US 2022/0390674 A1    Dec. 8, 2022

(30) Foreign Application Priority Data
Nov. 13, 2019   (JP) .................. 2019-205348

(51) Int. Cl.
*G02B 6/25*     (2006.01)
*G02B 6/42*     (2006.01)

(52) U.S. Cl.
CPC .............. *G02B 6/25* (2013.01); *G02B 6/421* (2013.01)

(58) Field of Classification Search
None
See application file for complete search history.

(56) References Cited

U.S. PATENT DOCUMENTS

2002/0146226 A1   10/2002   Davis
2018/0095219 A1*   4/2018   Bookbinder ....... G02B 6/02004
(Continued)

FOREIGN PATENT DOCUMENTS

CN     1504789 A     6/2004
CN   101299081 A    11/2008
(Continued)

*Primary Examiner* — Jerry Rahll
(74) *Attorney, Agent, or Firm* — Paratus Law Group, PLLC

(57) ABSTRACT

There is provided a light emitting element and an optical waveguide that propagates light from the light emitting element. For example, the optical waveguide is an optical fiber or a silicon optical waveguide. The light propagating through the optical waveguide is light having components of a fundamental mode and a first order mode, and the light propagates through the optical waveguide while having a light intensity distribution in which high intensity portions alternately appear in one direction and another direction opposite to the one direction with respect to the center of a core along the optical waveguide. A light intensity distribution at an output end surface of the optical waveguide is a light intensity distribution corresponding to an intermediate position between a first position where the high intensity portion is in the one direction and a second position where the high intensity portion is in the another direction. In a case of propagating the light having the components of the fundamental mode and the first order mode, it is possible to obtain favorable coupling efficiency regardless of a direction of an optical axis deviation, as in a case of propagating light having only the component of the fundamental mode. A cost is thus reduced by reducing accuracy of positional deviation.

13 Claims, 28 Drawing Sheets

(56) References Cited

U.S. PATENT DOCUMENTS

2022/0082769 A1\* 3/2022 Morita .................. H04B 10/25
2022/0131609 A1\* 4/2022 Morita ............... H04B 10/2581

FOREIGN PATENT DOCUMENTS

| JP | 2005062704 A | 3/2005 |
| JP | 2013250495 A | 12/2013 |
| JP | 2019-530015 A | 10/2019 |
| WO | WO 2007/043558 A1 | 4/2007 |
| WO | WO 2017/056889 A1 | 4/2017 |
| WO | WO 2018/027267 A1 | 2/2018 |
| WO | WO-2020184094 A1 | 9/2020 |
| WO | WO 2020/194094 A1 | 10/2020 |

\* cited by examiner

FIG. 2
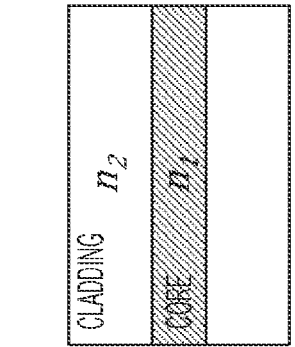
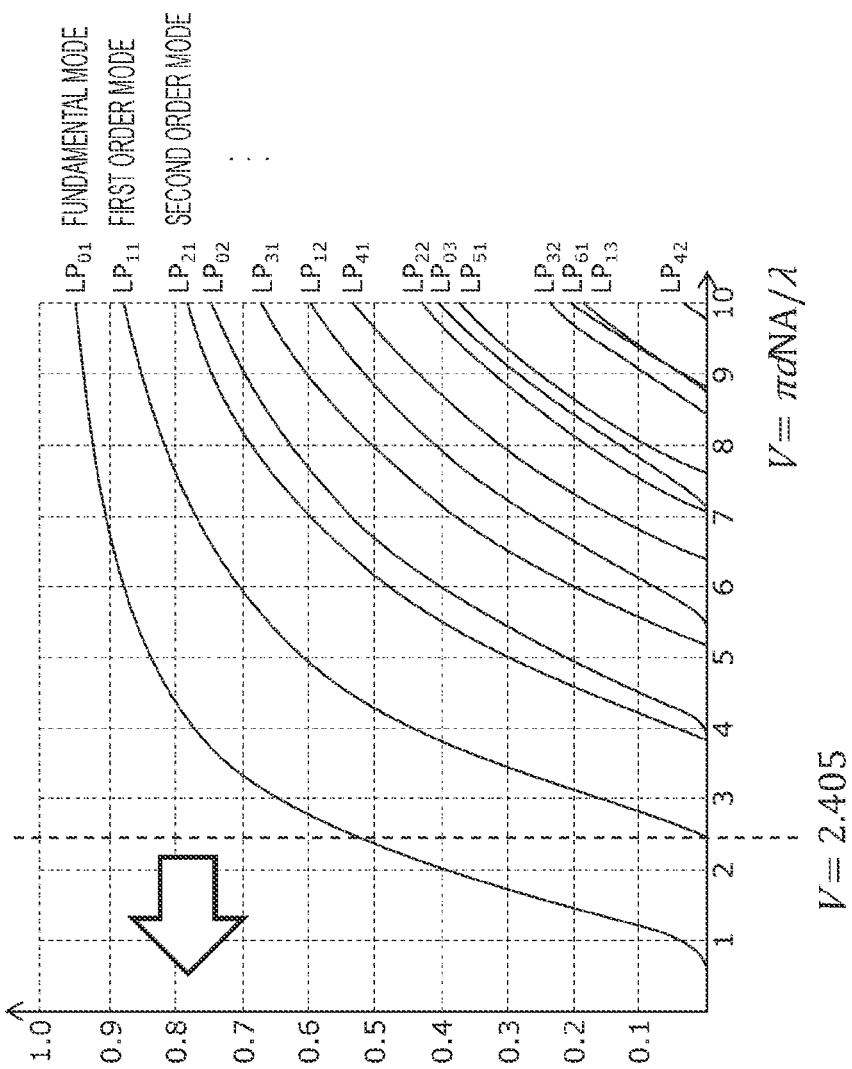

FIG. 3
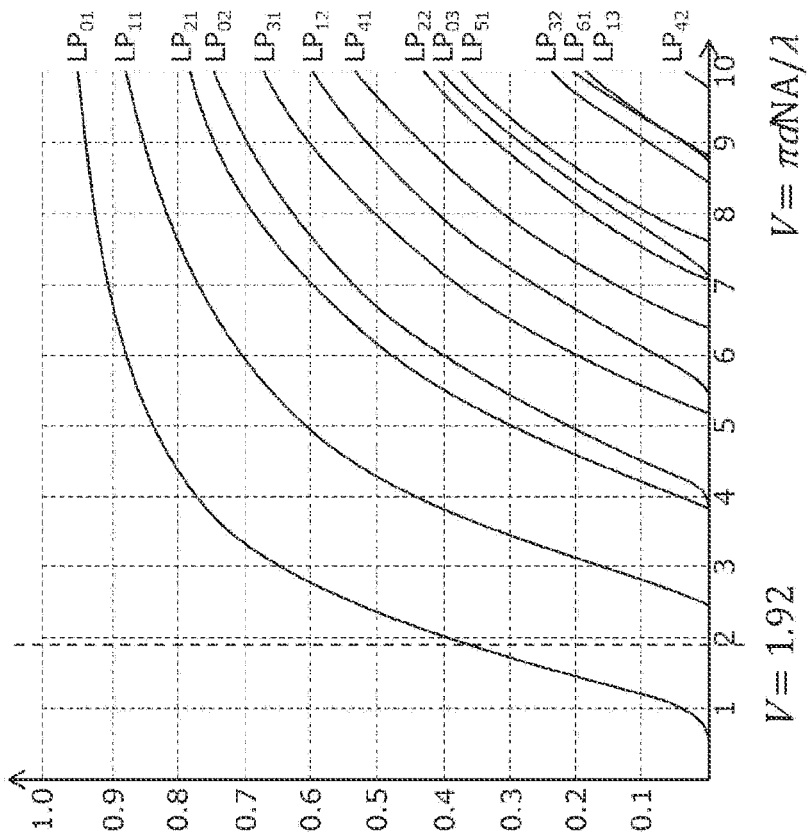
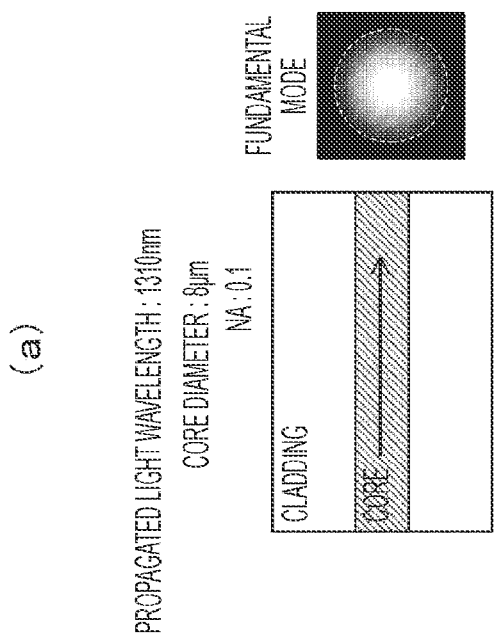

FIG. 5
(a)
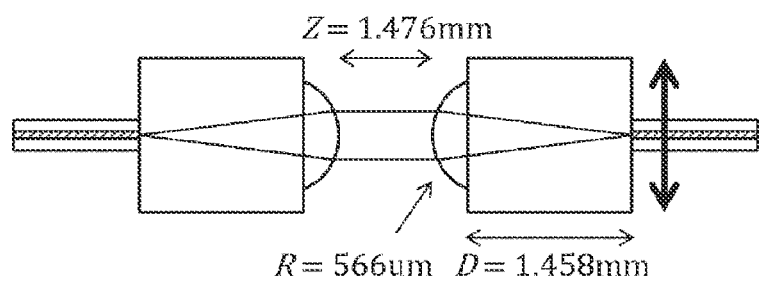
(b)
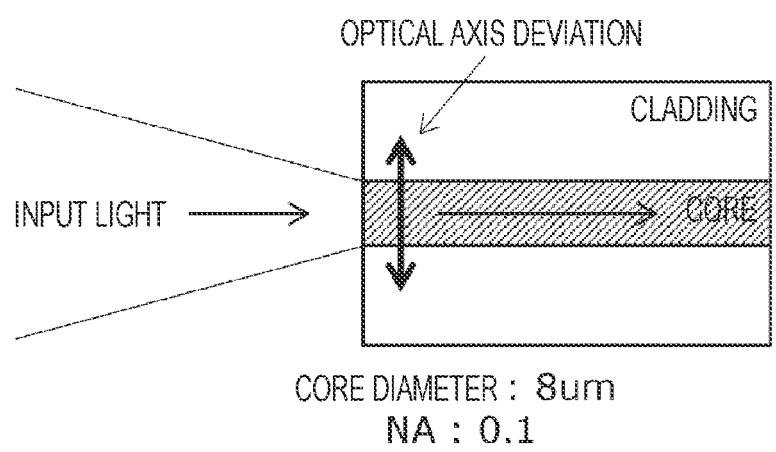

FIG. 21
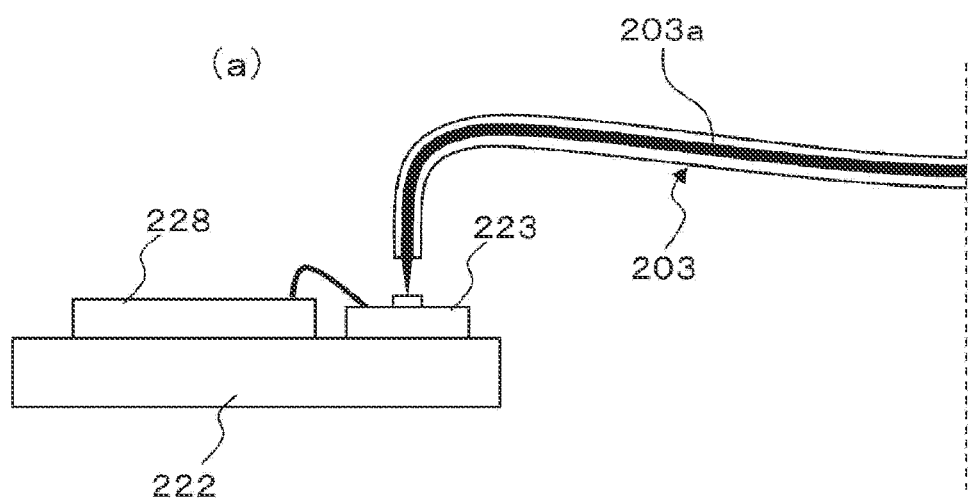
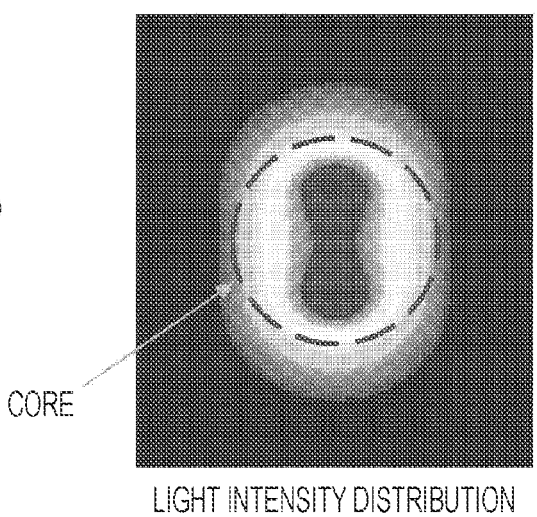
LIGHT INTENSITY DISTRIBUTION

FIG. 28
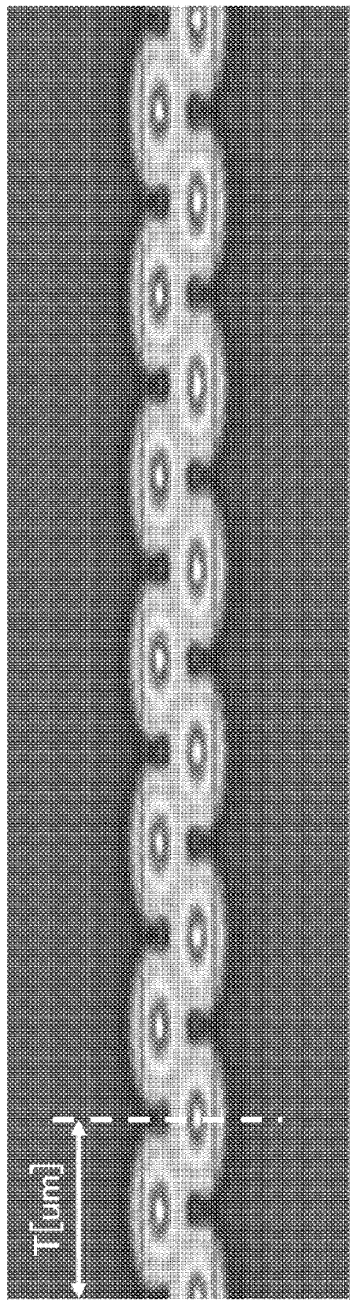
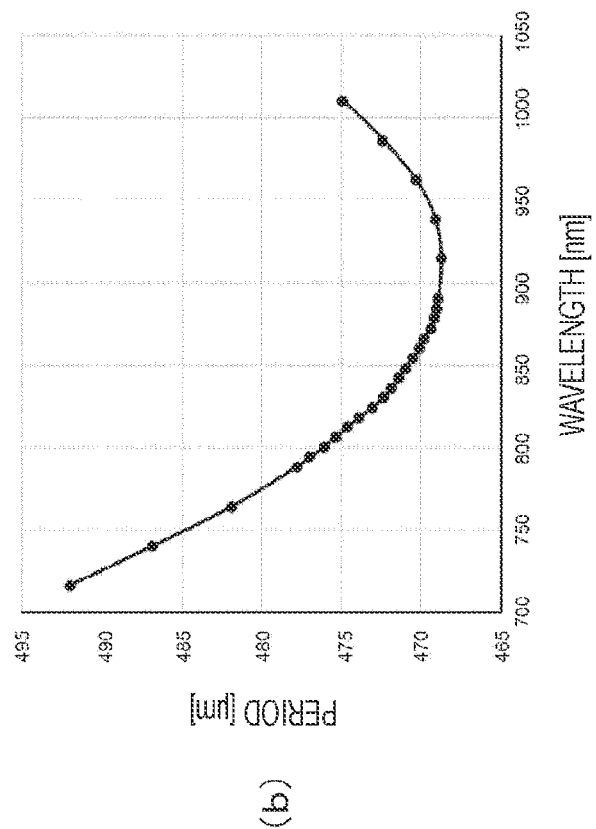
(a)
(b)

OPTICAL MODULE, ADJUSTMENT DEVICE, AND ADJUSTMENT METHOD

CROSS REFERENCE TO PRIOR APPLICATION

This application is a National Stage Patent Application of PCT International Patent Application No. PCT/JP2020/041799 (filed on Nov. 10, 2020) under 35 U.S.C. § 371, which claims priority to Japanese Patent Application No. 2019-205348 (filed on Nov. 13, 2019), which are all hereby incorporated by reference in their entirety.

TECHNICAL FIELD

The present technology relates to an optical module, an adjustment device, and an adjustment method, and more particularly relates to an optical module and the like capable of reducing accuracy of positional deviation.

BACKGROUND ART

There is conventionally known optical communication by spatial coupling (see, for example, Patent Document 1). In this optical communication, positional deviation causes a large loss of optical power particularly in a single mode fiber. Therefore, conventionally, an accuracy requirement for components is high in order to restrain positional deviation. This leads to an increase in cost.

CITATION LIST

Patent Document

Patent Document 1: WO 2017/056889 A

SUMMARY OF THE INVENTION

Problems to be Solved by the Invention cost by reducing accuracy of positional deviation.

Solutions to Problems

A concept of the present technology is an optical module including:
  a light emitting element; and
  an optical waveguide that propagates light from the light emitting element, in which:
  the light propagating through the optical waveguide is light having components of a fundamental mode and a first order mode;
  the light having the components of the fundamental mode and the first order mode propagates through the optical waveguide while having a light intensity distribution in which high intensity portions alternately appear in one direction and another direction opposite to the one direction with respect to the center of a core along the optical waveguide; and
  a light intensity distribution at an output end surface of the optical waveguide is a light intensity distribution corresponding to an intermediate position between a first position where the high intensity portion is in the one direction and a second position where the high intensity portion is in the another direction.

The present technology includes a light emitting element and an optical waveguide that propagates light from the light emitting element. For example, the optical waveguide may be an optical fiber or a silicon optical waveguide. Herein, the light propagating through the optical waveguide is light having components of a fundamental mode and a first order mode, and the light propagates through the optical waveguide while having a light intensity distribution in which high intensity portions alternately appear in direction and another direction opposite to the one direction with respect to the center of a core along the optical waveguide. Further, a light intensity distribution at an output end surface of the optical waveguide is a light intensity distribution corresponding to an intermediate position between a first position where the high intensity portion is in the one direction and a second position where the high intensity portion is in the another direction.

For example, the optical waveguide may propagate only the component of the fundamental mode at a first wavelength, and the light propagating through the optical waveguide may have a second wavelength at which the optical waveguide can propagate the components of the fundamental mode and the first order mode. In this case, for example, the first wavelength may be a wavelength in a 1310 nm band or a 1550 nm band, and the second wavelength may be a wavelength in an 850 nm band.

As described above, in the present technology, the light propagating through the optical waveguide is light having the components of the fundamental mode and the first order mode, and the light intensity distribution at the output end surface of the optical waveguide is the light intensity distribution corresponding to the intermediate position between the first position where the high intensity portion is in the one direction and the second position where the high intensity portion is in the another direction. Therefore, in a case of propagating the light having the components of the fundamental mode and the first order mode, it is possible to obtain favorable coupling efficiency regardless of a direction of an optical axis deviation, as in a case of propagating light having only the component of the fundamental mode. Therefore, it becomes unnecessary to use an additional component or a light source having a complicated structure so as to propagate light having only the component of the fundamental mode. This makes it possible to reduce a component cost.

Further, another concept of the present technology is an adjustment device including
  an adjustment unit that adjusts a light intensity distribution at an output end surface of an optical waveguide in an optical module including
  a light emitting element, and
  the optical waveguide that propagates light from the light emitting element, in which
  the light propagating through the optical waveguide is light having components of a fundamental mode and a first order mode, and
  the light having the components of the fundamental mode and the first order mode propagates through the optical waveguide while having a light intensity distribution in which high intensity portions alternately appear in one direction and another direction opposite to the one direction with respect to the center of a core along the optical waveguide,
  in which
  the adjustment unit makes an adjustment so that the light intensity distribution at the output end surface of the optical waveguide becomes a light intensity distribution corresponding to an intermediate position between a first position where the high intensity portion is in the one direction and a second position where the high intensity portion is in the another direction.

The present technology adjusts a light intensity distribution at an output end surface of an optical waveguide in an optical module including a light emitting element and the optical waveguide that propagates light from the light emitting element. Herein, the light propagating through the optical waveguide is light having components of a fundamental mode and a first order mode, and the light propagates through the optical waveguide while having a light intensity distribution in which high intensity portions alternately appear in one direction and another direction opposite to the one direction with respect to the center of a core along the optical waveguide.

The adjustment unit makes an adjustment so that the light intensity distribution at the output end surface of the optical waveguide becomes a light intensity distribution corresponding to an intermediate position between a first position where the high intensity portion is in the one direction and a second position where the high intensity portion is in the another direction. For example, the present technology may further include an acquisition unit that acquires information regarding the light intensity distribution at the output end surface of the optical waveguide, and the adjustment unit may make the adjustment on the basis of the acquired information regarding the light intensity distribution.

In this case, for example, the adjustment unit may make the adjustment by changing a length of the optical waveguide or by changing an emission wavelength of the light emitting element.

For example, the adjustment unit may cut or polish an output end of the optical waveguide in units of a predetermined length until the light intensity distribution at the output end surface of the optical waveguide becomes the light intensity distribution corresponding to the intermediate position between the first position and the second position. Further, for example, the adjustment unit may calculate a length to be shortened in order that the light intensity distribution at the output end surface of the optical waveguide becomes the light intensity distribution corresponding to the intermediate position between the first position and the second position on the basis of the information regarding the light intensity distribution acquired before the length is shortened and the information regarding the light intensity distribution acquired when the length is shortened by a predetermined length and may further shorten the length by the calculated length.

As described above, the present technology makes the adjustment so that the light intensity distribution at the output end surface of the optical waveguide in the optical module including the light emitting element and the optical waveguide that propagates light from the light emitting element, in which the light propagating through the optical waveguide is the light having the components of the fundamental mode and the first order mode, becomes the light intensity distribution corresponding to the intermediate position between the first position where the high intensity portion is in the one direction and the second position where the high intensity portion is in the another direction. This makes it possible to obtain an optical module that can obtain favorable coupling efficiency, regardless of the direction of the optical axis deviation, in a case of propagating the light having the components of the fundamental mode and the first order mode, as in a case of propagating light having only the component of the fundamental mode.

BRIEF DESCRIPTION OF DRAWINGS

FIG. 2 illustrates a basic structure of an optical fiber and LPml modes of a step optical fiber.

FIG. 3 illustrates a normalized frequency V in a general case of 1310 nm in a single mode.

FIG. 5 illustrates a case where an optical axis deviation occurs under the condition that only the fundamental mode LP01 exists in input light.

FIG. 21 is explanatory diagrams of an optical module adjustment device according to an embodiment.

FIG. 28 is a simulation diagram of a light intensity distribution obtained in a case where light having components of a fundamental mode and a first order mode is transmitted through an optical fiber and is a graph showing a relationship between wavelength [nm] and period [μm].

MODE FOR CARRYING OUT THE INVENTION

Hereinafter, modes for carrying out the invention (hereinafter, referred to as "embodiments") will be described. Note that description will be provided in the following order.
1. Embodiment
2. Modification examples 1. Embodiment

[Basic Description of Present Technology]

Figure 1:
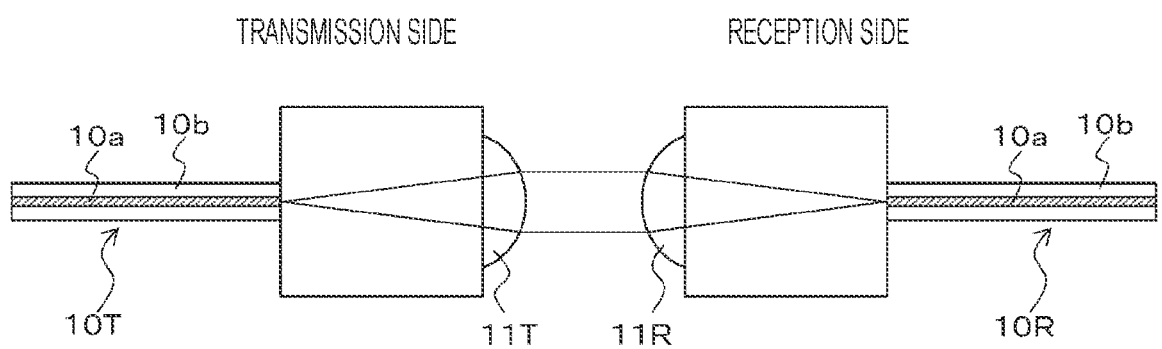
FIG. 1 illustrates an outline of optical communication by spatial coupling.

First, a technology regarding the present technology will be described. FIG. 1 illustrates an outline of optical communication by spatial coupling. In this case, light emitted from an optical fiber 10T on a transmission side is formed into collimated light by a lens 11T and is emitted therefrom. Then, this collimated light is condensed by a lens 11R on a reception side and is incident on an optical fiber 10R. In this optical communication, positional deviation causes a large loss of optical power particularly in a single mode fiber. Note that the optical fibers 10T and 10R have a double structure of a core 10a at a central portion serving as an optical path and a cladding 10b covering the core.

Next, a basic concept of a mode will be described. In order to propagate light through an optical fiber in a single mode, it is necessary to determine parameters such as a refractive index and a core diameter of the fiber so that only one mode exists.

FIG. 2(a) illustrates a basic structure of an optical fiber. The optical fiber has a structure in which a center portion called core is covered with a layer called cladding. In this case, a refractive index n1 of the core is high, whereas a refractive index n2 of the cladding is low, and light propagates while being enclosed in the core.

FIG. 2(b) show linearly polarized (LPml) modes of a step optical fiber and shows a normalized propagation constant b as a function of a normalized frequency V. The vertical axis represents the normalized propagation constant b, and b=0 is satisfied in a state in which a certain mode does not pass (is blocked), whereas b is closer to 1 as more optical power is enclosed in the core (can be propagated). The horizontal axis represents the normalized frequency V and can be expressed by Mathematical Expression (1) below. Herein, d represents a core diameter, NA represents a numerical aperture, and λ represents a wavelength of light.

$$V = \pi d NA/\lambda \quad (1)$$

For example, when V=2.405 is satisfied, LP11 is blocked, and thus only LP01 exists as a mode. Therefore, a state of V=2.405 or less is a single mode. Herein, LP01 is a fundamental mode (zeroth order mode), and, after that, LP11, LP21, . . . are a first order mode, a second order mode, . . . , respectively.

For example, as illustrated in FIG. 3(a), the normalized frequency V in a general case of 1310 nm in the single mode will be described. Herein, when the core diameter d and the numerical aperture NA are d=8 μm and NA=0.1, respectively, which are general parameters of a 1310 nm optical fiber, and a wavelength of light propagating through the fiber is 1310 nm, V=1.92 is obtained from Mathematical Expression (1).

Therefore, as illustrated in FIG. 3(b), the normalized frequency V is 2.405 or less, and thus only the fundamental mode LP01 is propagated, which is the single mode. Herein, when the core diameter is increased, the number of modes that can be propagated increases. Incidentally, for example, a general multimode fiber propagates several hundreds of modes because the core diameter is set to a value such as 50 μm.

In the case of optical communication by spatial coupling illustrated in FIG. 1, alignment of optical coupling units on the transmission side/reception side is severe because the core diameter is small in the single mode. This causes a problem that an accuracy requirement for accurately aligning optical axes rises.

In order to solve this problem, generally, a highly accurate component is used, or a light input unit to an optical fiber is processed, thereby facilitating entering of light into a fiber core. However, the highly accurate component is expensive, and a component requiring processing needs a high processing cost. Therefore, a connector and a system for single mode communication are generally expensive.

The present technology can reduce a cost by reducing accuracy of optical axis alignment. In the present technology, first, an optical fiber can propagate only a fundamental mode at first wavelength, and the optical fiber is configured to perform communication by using light having a second wavelength at which not only the fundamental mode but also a first order mode can be propagated.

Figure 4:
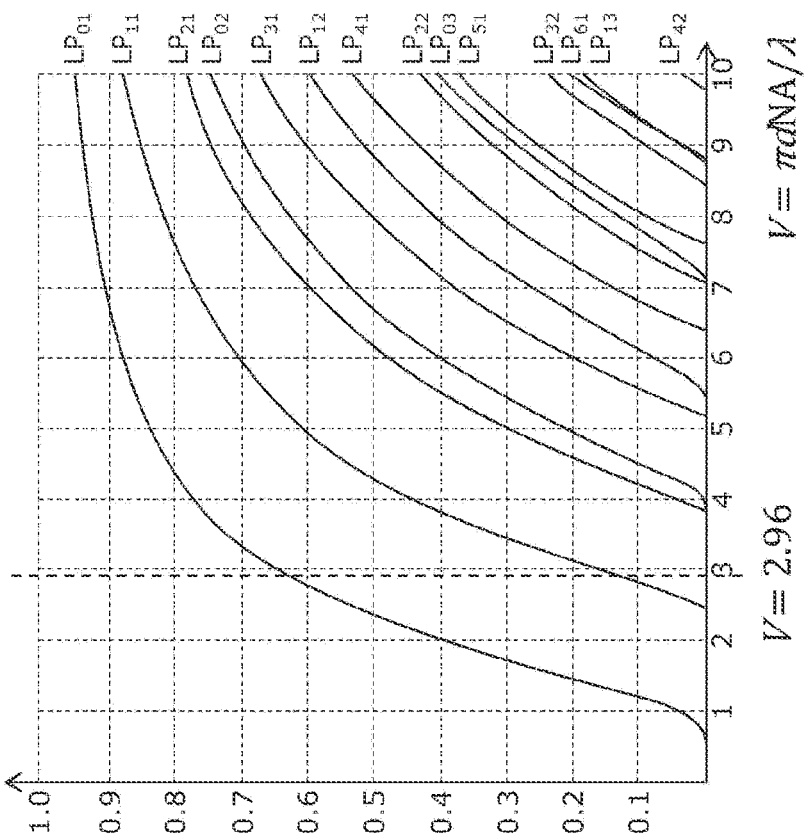
FIG. 4 is an explanatory diagram showing that a fundamental mode LP01 and a first order mode LP11 can exist in a case where light having a wavelength of 850 nm is input to a single mode fiber of 1310 nm.

For example, in a case where light having a wavelength of 850 nm instead of 1310 nm is input to an optical fiber having the same condition as that of FIG. 3(a), the normalized frequency V=2.96 is satisfied as illustrated in FIG. 4(b). Therefore, as illustrated in FIG. 4(a), the fundamental mode LP01 and the first order mode LP11 can exist.

There will be described a case where, when an optical system illustrated in FIG. 5(a) is assembled, a position of an optical fiber on the reception side deviates in a direction perpendicular to an optical axis (see arrows in FIGS. 5(a) and 5(b)), that is, an optical axis deviation occurs under the condition that only the fundamental mode LP01 exists in input light.

Figure 6:
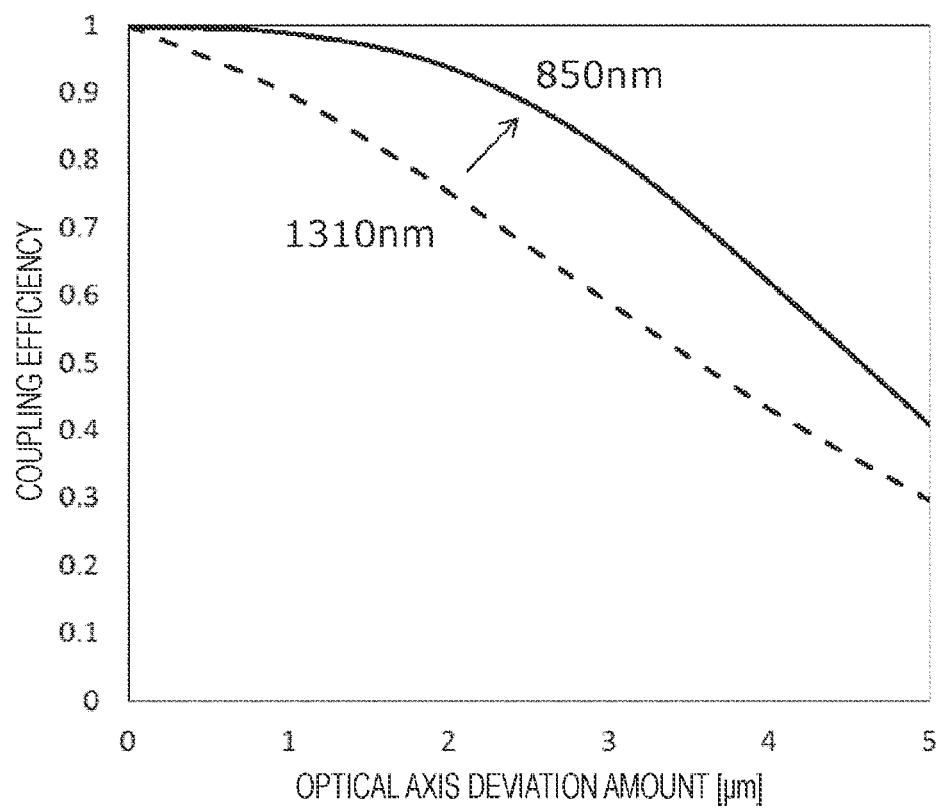
FIG. 6 is a graph showing simulation results of loss amounts at wavelengths of input light of 1310 nm and 850 nm.

FIG. 6 is a graph showing simulation results of coupling efficiency of optical power in that case. The horizontal axis represents an optical axis deviation amount, and the vertical axis represents the coupling efficiency. In a state in which there is no deviation, 100% of power is propagated to the optical fiber, and the coupling efficiency is 1. Further, for example, in a case where only 50% of power with respect to the input light is propagated to the optical fiber, the coupling efficiency is 0.5.

Comparing wavelengths of the input light of 1310 nm and 850 nm, it can be seen that a characteristic in the case of 850 nm is favorable. This is because only the fundamental mode can be propagated in the case of 1310 nm, whereas the first order mode can be propagated in addition to the fundamental mode in the case of 850 nm (see FIG. 4(a)).

Figure 7:
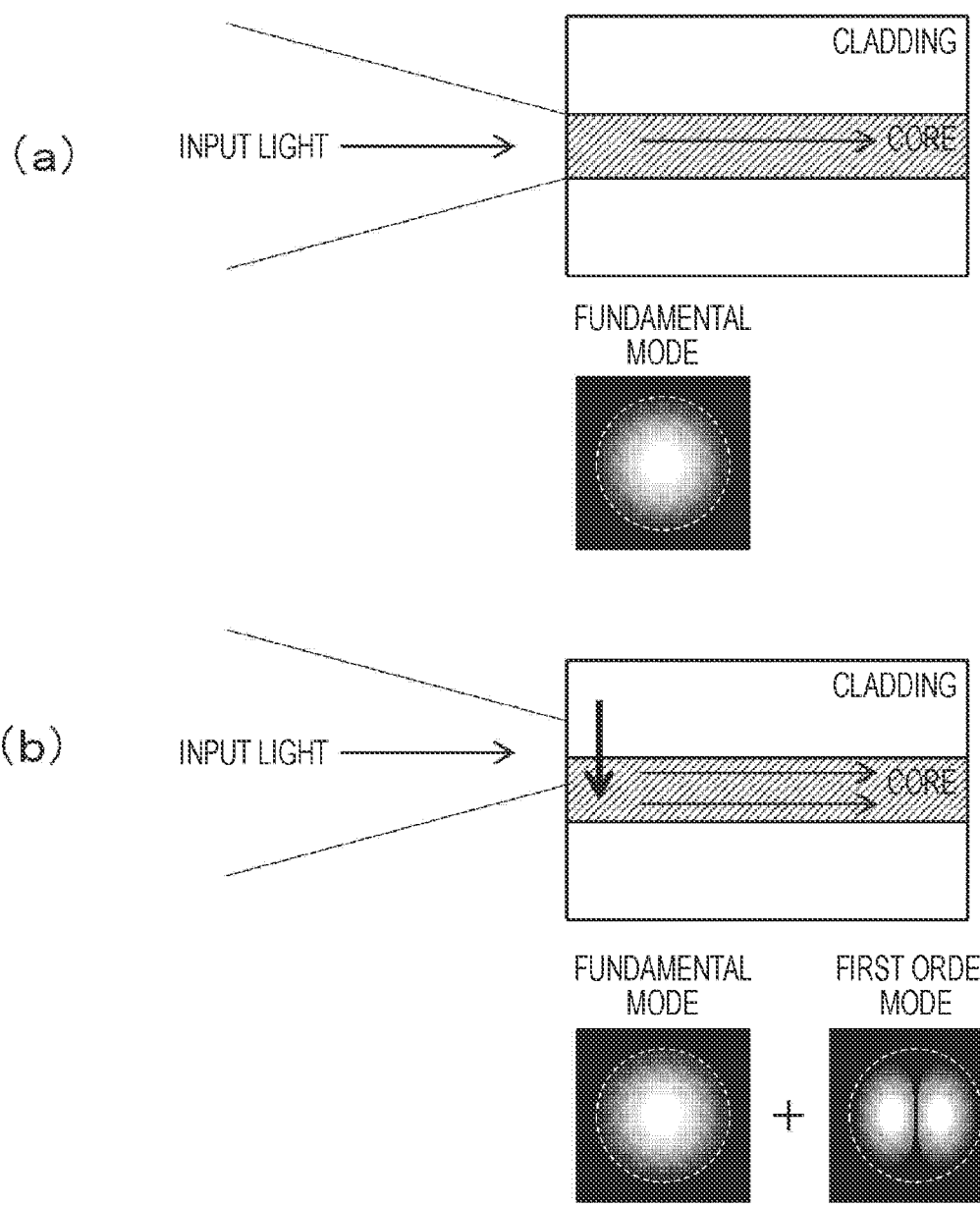
FIG. 7 illustrates that only a fundamental mode exists in input light in a state in which there is no optical axis deviation, whereas a part of the fundamental mode is converted into a first order mode in a state in which there is an optical axis deviation.

That is, in a state in which there is no optical axis deviation, only the fundamental mode exists in the input light as illustrated in FIG. 7(a). Meanwhile, in a state in which there is an optical axis deviation, as illustrated in FIG. 7(b), a part of the fundamental mode is converted into the first order mode by using a phase difference caused by a difference in refractive index between the cladding and the core. The first order mode cannot be propagated in the case of 1310 nm, but, in the case of 850 nm, the first order mode can be propagated. Therefore, the characteristic in the case of 850 nm is favorable.

Figure 8:
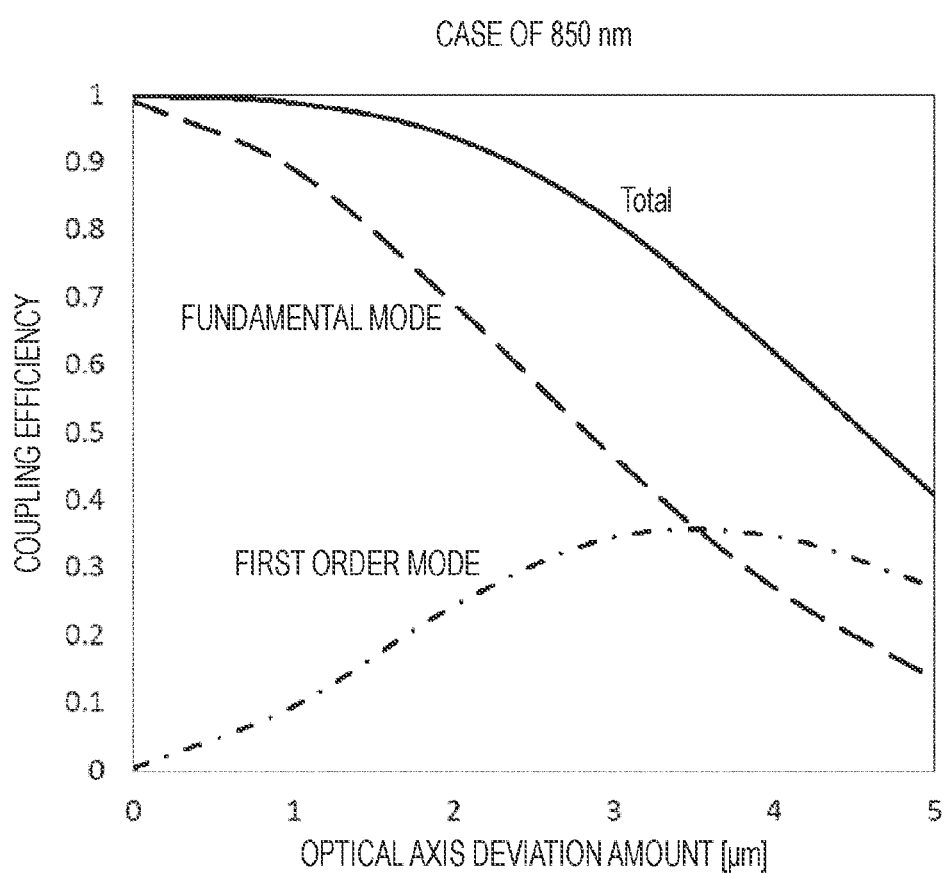
FIG. 8 is a graph showing that a fundamental mode is converted into a first order mode in accordance with deviation.

A graph of FIG. 8 separately shows a component of the fundamental mode (zeroth order mode) and a component of the first order mode, and a total curve indicates the sum thereof. Only the fundamental mode exists in the input light, and thus it can be seen that the fundamental mode is converted into the first order mode in accordance with the deviation. Meanwhile, in the case of 1310 nm, only the fundamental mode can be propagated as illustrated in FIG. 3(a), and thus, the fundamental mode is purely reduced as illustrated in FIG. 6.

In FIG. 6, it is possible to reduce accuracy for a positional deviation about 1.8 times when 1310 nm and 850 nm are compared with the coupling efficiency of 0.8 (about −1 dB) and about 2.35 times when 1310 nm and 850 nm are compared with the coupling efficiency of 0.9 (about −0.5 dB).

As described above, the optical fiber can propagate only the fundamental mode at the first wavelength (e.g., 1310 nm), and the optical fiber is configured to perform communication by using light having the second wavelength (e.g., 850 nm) at which not only the fundamental mode but also the first order mode can be propagated. This makes it possible to increase the coupling efficiency of the optical power.

Further, in the present technology, second, communication is performed by using light having components of the fundamental mode and the first order mode.

Figure 9:
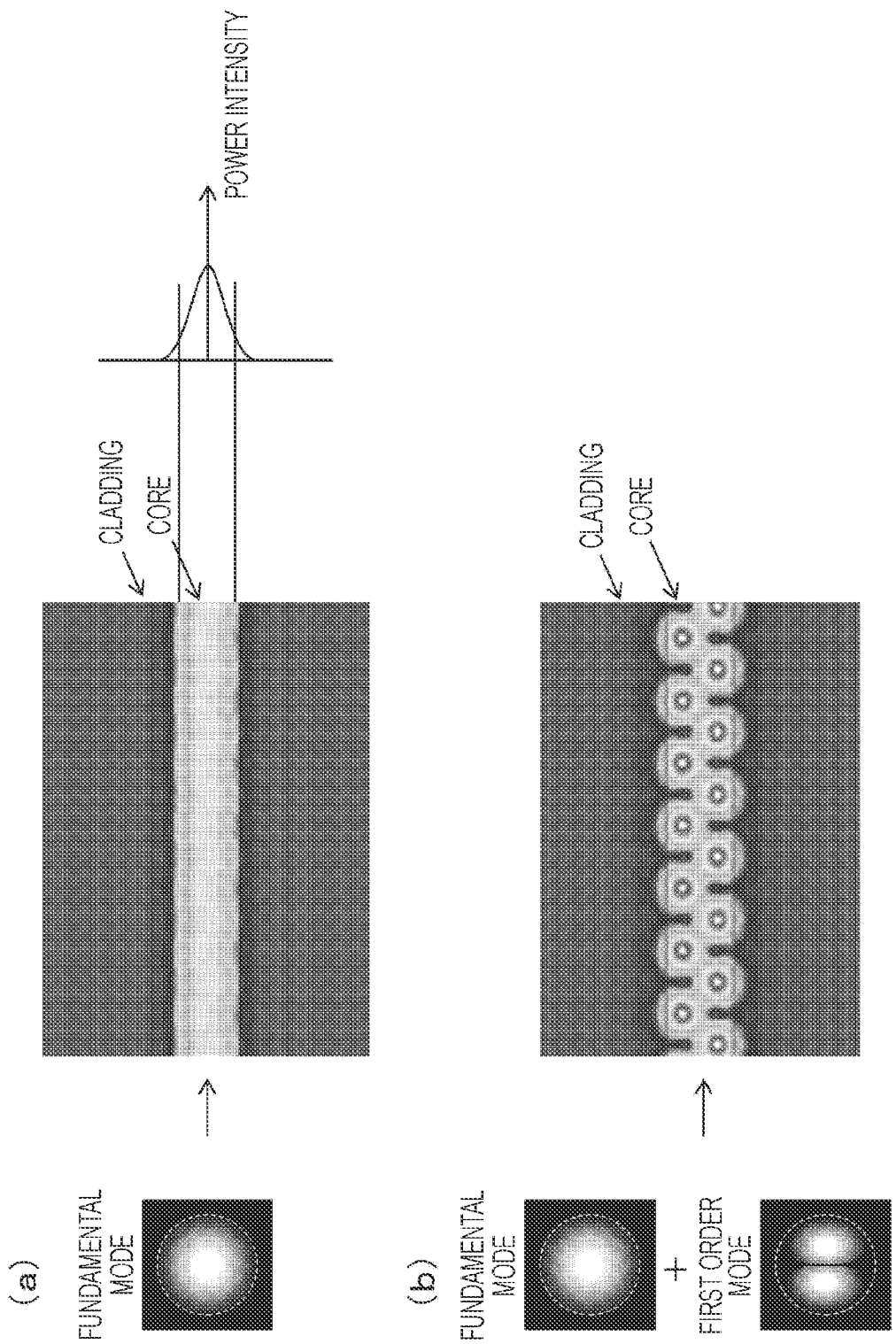
FIG. 9 is simulation diagrams of intensity distributions of light transmitted through an optical fiber.

FIG. 9 is simulation diagrams of intensity distributions of light transmitted through an optical fiber. FIG. 9(a) illustrates an example where light having only the component of the fundamental mode propagates. In this case, the center of a core of the optical fiber has the highest intensity, and the intensity decreases toward the cladding. FIG. 9(b) illustrates an example where light having the components of the fundamental mode and the first order mode propagates. In this case, high intensity portions alternately appear in one direction and another direction opposite to the one direction with respect to the center of the core, that is, in an upward direction and a downward direction in the example of FIG. 9(b).

Figure 10:
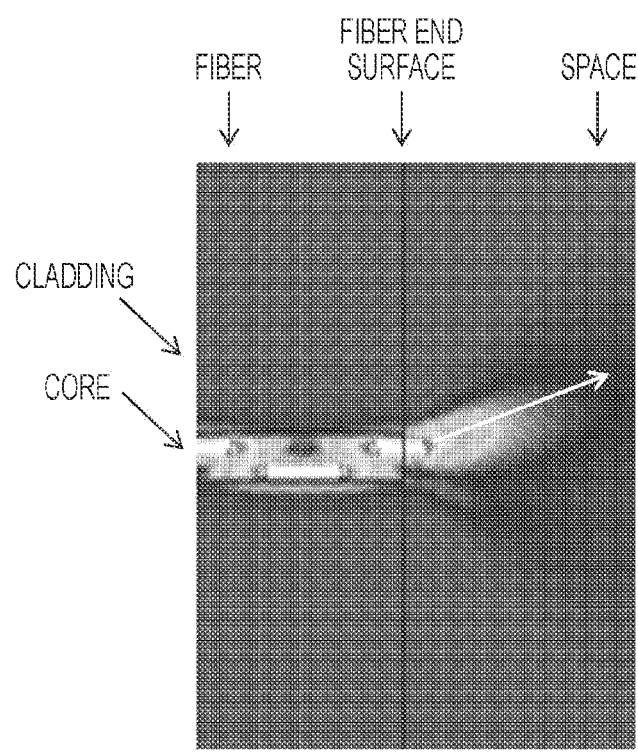
FIG. 10 is an explanatory diagram of an angle at which light emitted from a fiber end surface travels.

In a case where light is emitted from a fiber end surface in a state of FIG. 9(b) as illustrated in FIG. 10, the light travels at a certain angle toward a higher intensity with respect to the center of the core. FIG. 10 illustrates an example of emission of light from the fiber end surface. In this example, a high intensity portion is located in the upward direction with respect to the center of the core, and thus the light is emitted from the fiber end surface at a certain angle in the upward direction.

The optical communication by spatial coupling illustrated in FIG. 1 will be described. As illustrated in FIG. 11(a), light emitted from the center of the core 10a on the transmission side is coupled to the center of the core 10a on the reception side. However, as illustrated in FIG. 11(b), in a case where light having the components of the fundamental mode and the first order mode propagates, light having an intensity distribution deviating in the upward direction from the center of the core 10a on the transmission side is coupled in the downward direction from the center of the core 10a on the reception side.

Figure 11:
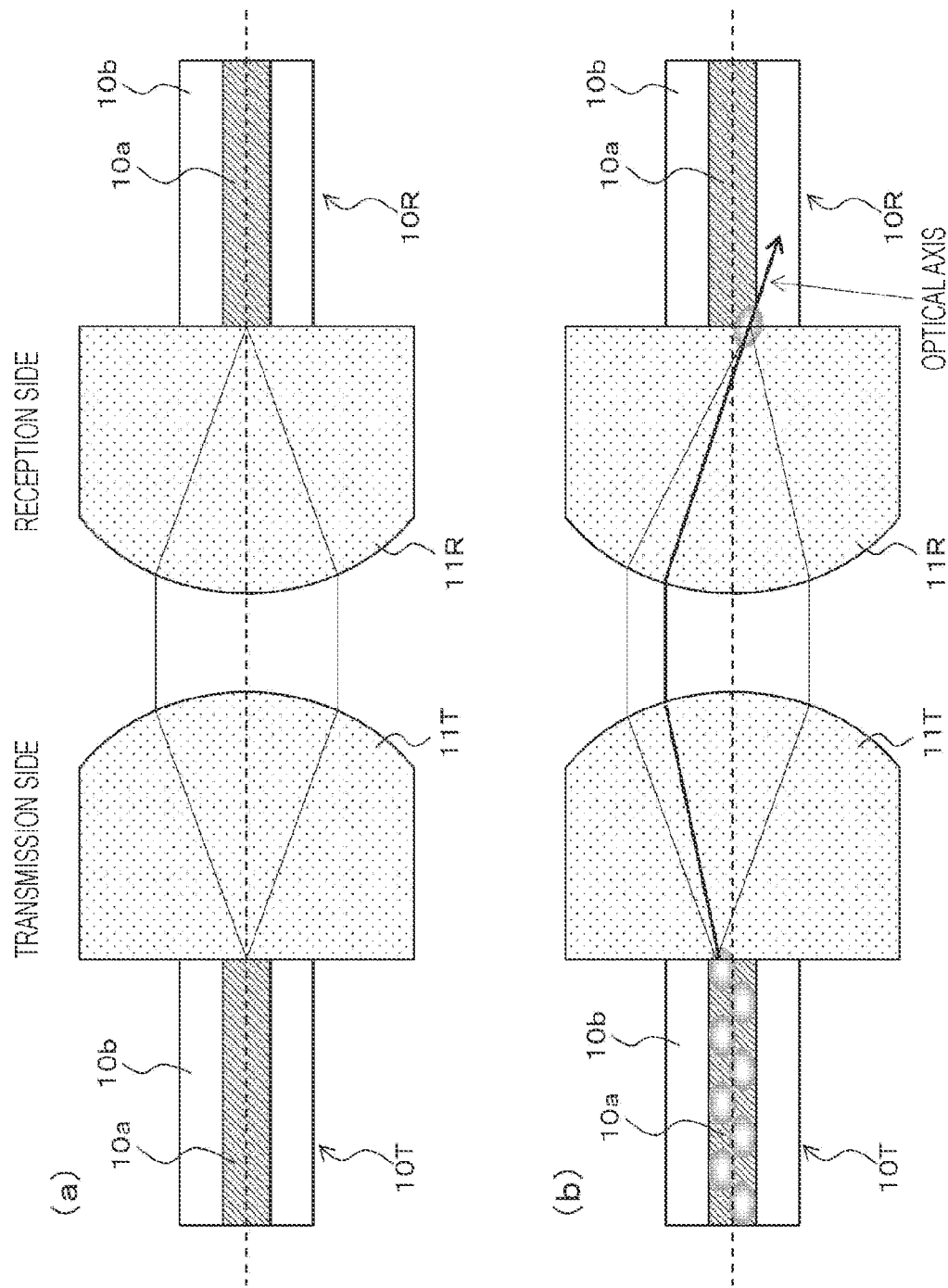
FIG. 11 is explanatory diagrams of optical communication by spatial coupling.
Figure 12:
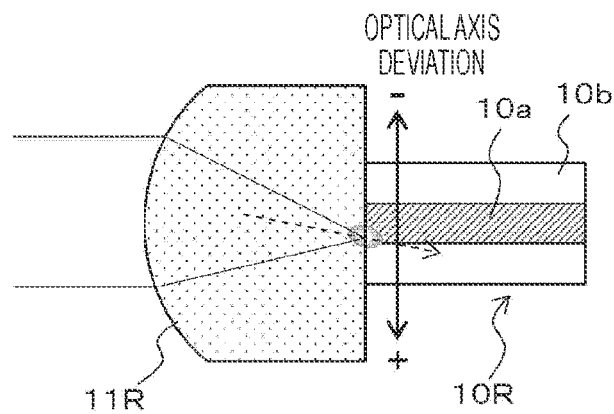
FIG. 12 is an explanatory diagram of an optical axis deviation in which a position of an optical fiber deviates in a direction perpendicular to a lens.

There will be described a case where, as illustrated in FIG. 12, an optical axis deviation in which a position of the optical fiber 10R on the reception side deviates in a direction perpendicular to the lens 11R occurs under the condition illustrated in FIG. 11(b). In this case, a state illustrated in FIG. 12 is a state in which the optical axis deviation amount is zero. In a case where the optical axis deviation occurs in a positive (+) direction, a high light-intensity portion is in a direction of entering the core 10a of the optical fiber 10R and is therefore easily coupled. Meanwhile, in a case where the optical axis deviation occurs in a negative (−) direction, the core 10a of the optical fiber 10R moves to an opposite side to a traveling direction of light, and thus, the coupling efficiency decreases.

Figure 13:
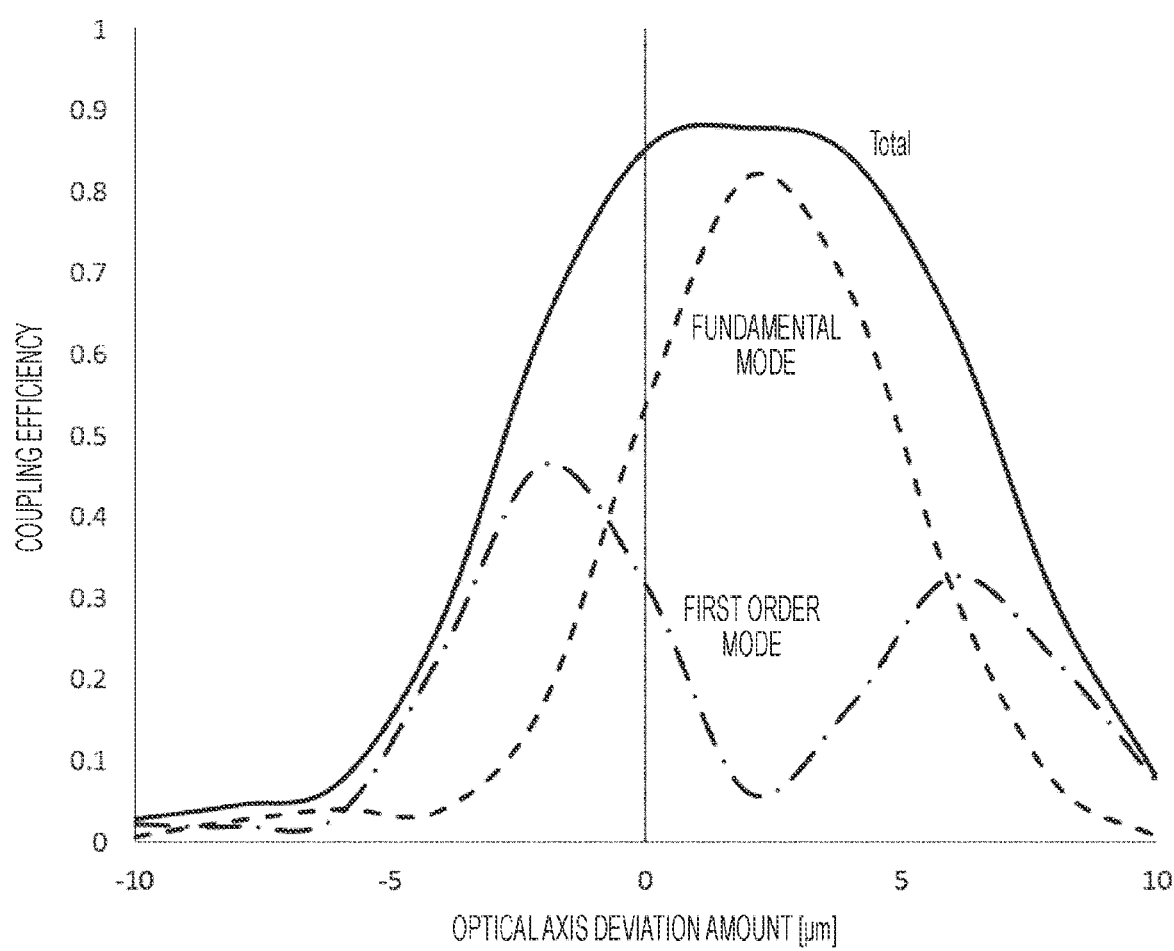
FIG. 13 is a graph showing simulation results of coupling efficiency of optical power.

FIG. 13 is a graph showing simulation results of the coupling efficiency of the optical power obtained in a case where input light (light emitted from the transmission side) has the components of the fundamental mode and the first order mode and a ratio thereof is 1:1. The horizontal axis represents the optical axis deviation amount, and the vertical axis represents the coupling efficiency. The example of FIG. 13 separately shows the fundamental mode (zeroth order mode) and the first order mode, and a total curve indicates the sum thereof.

Figure 14:
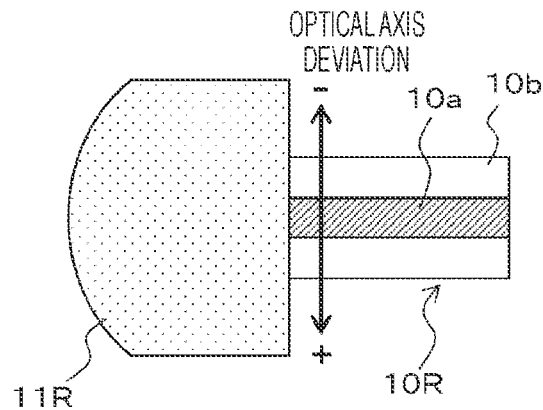
FIG. 14 is an explanatory diagram of an optical axis deviation in which a position of an optical fiber deviates in a direction perpendicular to a lens.

Herein, there will be described a case where, in the optical communication by spatial coupling illustrated in FIG. 11, the optical axis deviation in which the position of the optical fiber 10R on the reception side deviates in the direction perpendicular to the lens 11R occurs as illustrated in FIG. 14 in a case where the input light (light emitted from the transmission side) has only the component of the fundamental mode and in a case where the input light has the components of the fundamental mode and the first order mode.

Figure 15:
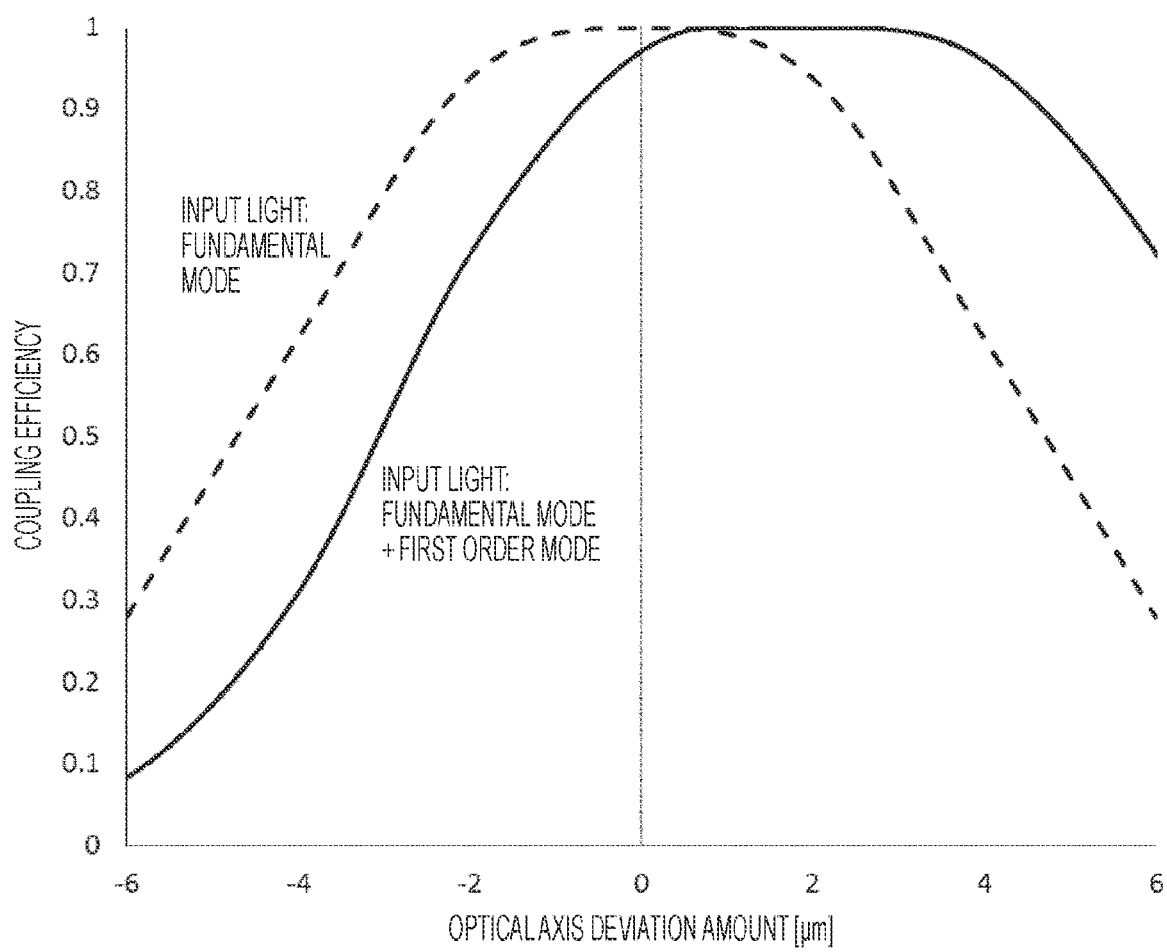
FIG. 15 is a graph showing simulation results of coupling efficiency of optical power.

FIG. 15 is a graph showing simulation results of the coupling efficiency of the optical power in a case where the input light has only the component of the fundamental mode and in a case where the input light has the components of the fundamental mode and the first order mode. The horizontal axis represents the optical axis deviation amount, and the vertical axis represents the coupling efficiency. Herein, in order to unify references, the coupling efficiency at a highest intensity portion is normalized as 1.

When the optical axis deviation occurs in the positive (+) reaction, the coupling efficiency is higher in a case where the input light has the components of the fundamental mode and the first order mode than in a case where the input light has only the component of the fundamental mode. This is because, as described above, in a case where the optical axis deviation occurs in the positive (+) direction, a high light-intensity portion is in the direction of entering the core 10a of the optical fiber 10R and is therefore easily coupled.

However, when the optical axis deviation occurs in the negative (−) direction, the coupling efficiency is lower in a case where the input light has the components of the fundamental mode and the first order mode than in a case where the input light has only the component of the fundamental mode. This is because, as described above, the core 10a of the optical fiber 10R moves to the opposite side to the traveling direction of the light.

There is a problem that, for an optical axis deviation, in a case where communication is performed by using the light having the components of the first order mode and the fundamental mode as described above, the coupling efficiency is deteriorated depending on a direction of the deviation, as compared with a case where communication is performed by using light having only the component of the fundamental mode. It is desirable to obtain favorable coupling efficiency regardless of a direction of the axis deviation, as in a case where communication is performed by using light having only the component of the fundamental mode.

Note that it is known that, in a general inexpensive system, light from a light emitting element is converted into light having the components of the first order mode and the fundamental mode when the light is input to an optical fiber. Therefore, in a case where communication is performed by using light having only the component of the fundamental mode, it is necessary to use an additional component or a light source having a complicated structure. Further, when positions of the light source and the core of the fiber are not aligned, the fundamental mode is converted into the first order mode. Therefore, it is generally difficult to perform communication by purely using only the fundamental mode.

Further, in the present technology, third, a light intensity distribution at an output end surface of the optical fiber is configured not to deviate in one direction from the center of the core. That is, the light intensity distribution at the output end surface of the optical fiber is configured to be a light intensity distribution corresponding to an intermediate position between a first position where a high intensity portion is in one direction and a second position where a high intensity portion is in another direction opposite to the one direction. Note that the intermediate position does not mean a strict intermediate position, but means a position within a certain range including the strict intermediate position.

Figure 16:
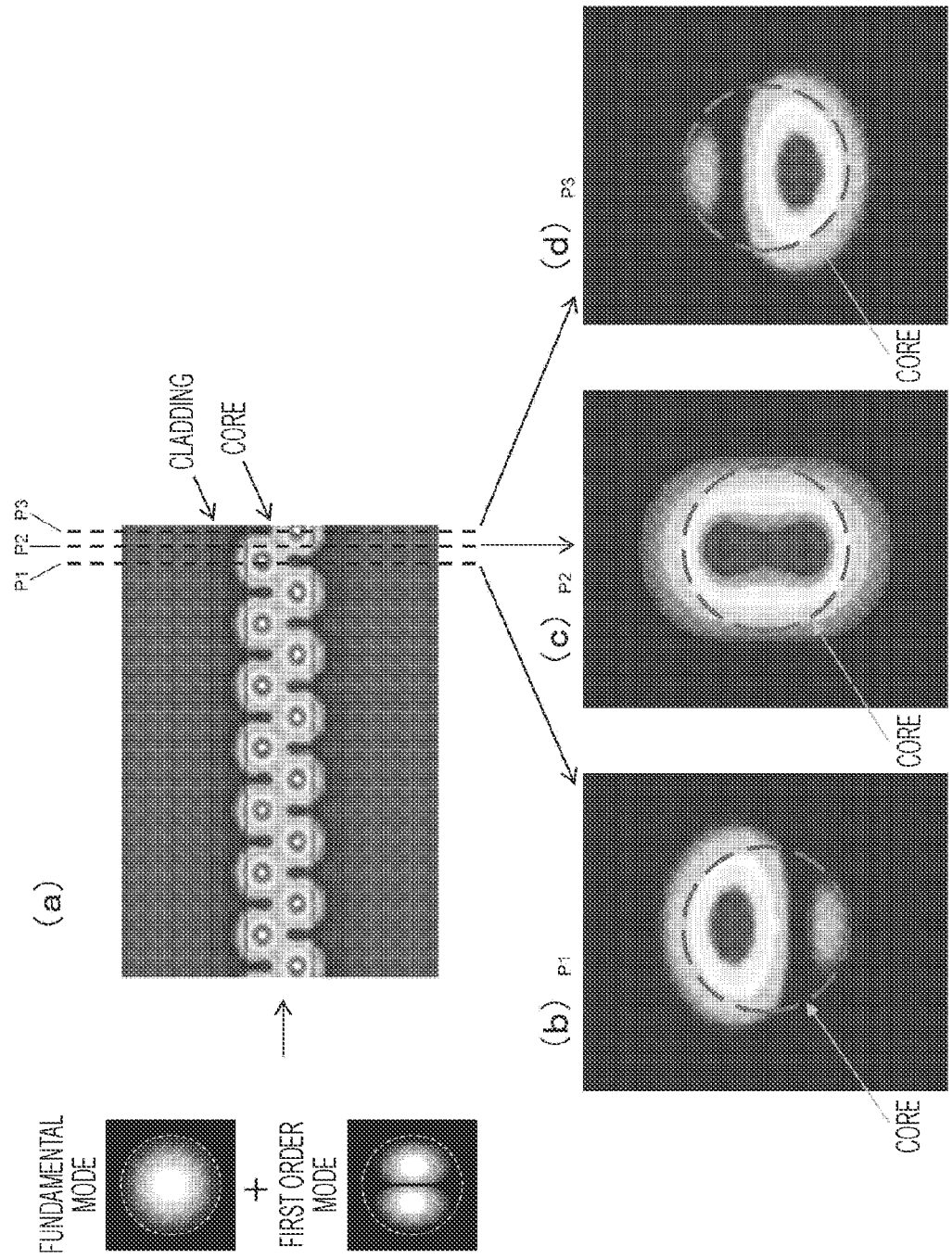
FIG. 16 is a simulation diagram and the like of a light intensity distribution obtained in a case where light having components of a fundamental mode and a first order mode is transmitted through an optical fiber.

FIG. 16(a), as well as FIG. 9(b) described above, is a simulation diagram of a light intensity distribution obtained in a case where light having the components of the fundamental mode and the first order mode is transmitted through the optical fiber. FIGS. 16(b), 16(c), and 16(d) illustrate light intensity distributions at the output end surface of the optical fiber cut at positions P1, P2, and P3, respectively. Note that circles indicated by broken lines in FIGS. 16(b), 16(c), and 16(d) indicate an outer periphery of the core.

Herein, the position P1 is the first position where the high intensity portion is in the one direction, the position P3 is the second position where the high intensity portion is in the another direction, and the position P2 indicates the intermediate position between the first position and the second position. The light intensity distribution deviates in the one direction from the center of the core at the position P1, and the light intensity distribution deviates in the another direction from the center of the core at the position P3. However, the light intensity distribution does not deviate in one direction from the center of the core at the position P2.

Figure 17:
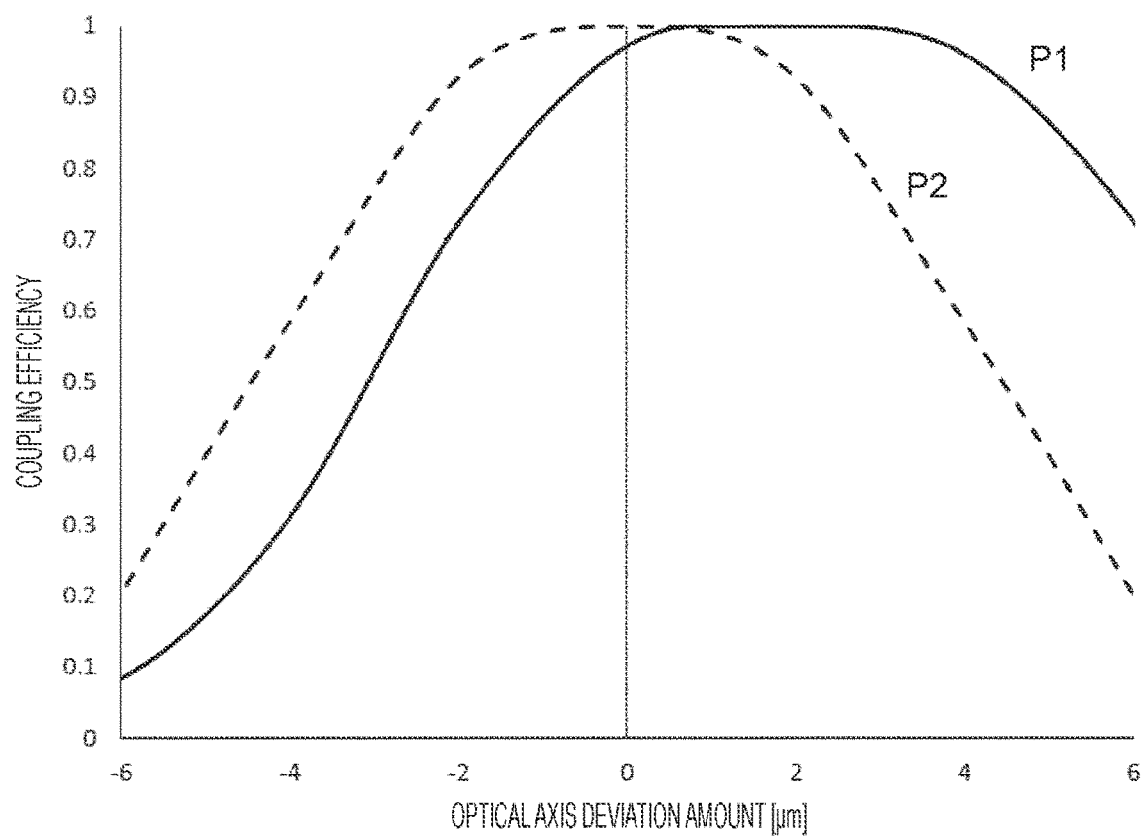
FIG. 17 is a graph showing simulation results of coupling efficiency of optical power obtained in a case where an output end surface of an optical fiber is located at a position P1 and a position P2.

FIG. 17 is a graph showing simulation results of the coupling efficiency of the optical power obtained in a case where the output end surface of the optical fiber is located at the position P1 and the position P2. The horizontal axis represents the optical axis deviation amount, and the vertical axis represents the coupling efficiency. Herein, in order to unify references, the coupling efficiency at a highest intensity portion is normalized as 1.

Also herein, there will be described a case where, in the optical communication by spatial coupling illustrated in FIG. 11, the optical axis deviation in which the position of the optical fiber 10R on the reception side deviates in the direction perpendicular to the lens 11R occurs as illustrated in FIG. 14 in a case where the input light (light emitted from the transmission side) has the components of the fundamental mode and the first order mode.

In a case where the output end surface of the optical fiber is located at the position Ph, the coupling efficiency is improved when the optical axis deviation is in the positive (+) direction, but, conversely, the coupling efficiency is deteriorated when the optical axis deviation is in the negative (−) direction. Meanwhile, in a case where the output end surface of the optical fiber is located at the position P2, the coupling efficiency obtained when the optical axis deviation is in the positive (+) direction is lower than in a case where the output end surface of the optical fiber is located at the position P1, but the coupling efficiency obtained when the optical axis deviation is in the negative (−) direction is higher than in a case where the output end surface of the optical fiber is located at the position P1. That is, in this case, it is possible to obtain favorable coupling efficiency regardless of the direction of the axis deviation, as in a case where communication is performed by using light having the component of the fundamental mode.

[Transmission/Reception System]

Figure 18:
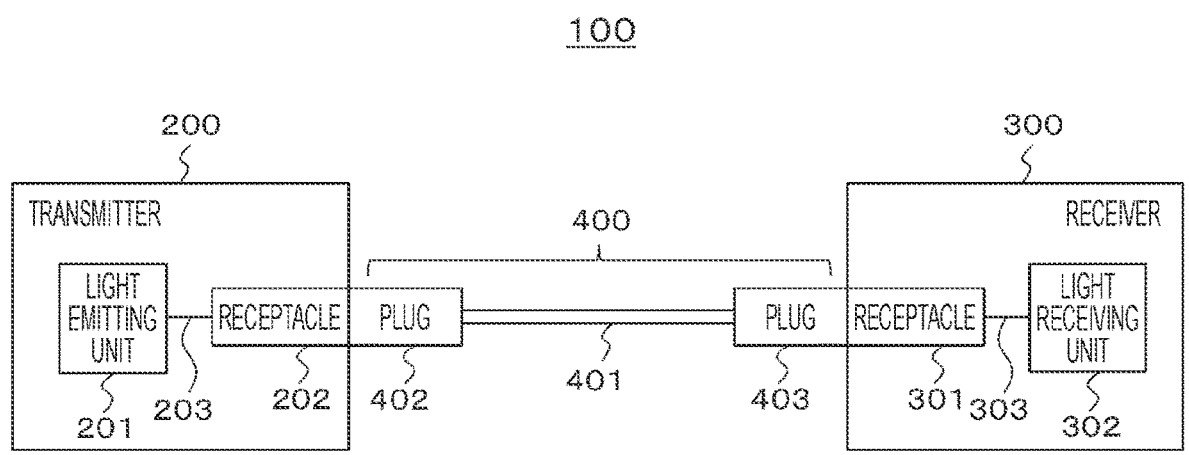
FIG. 18 is a block diagram illustrating a configuration example of a transmission/reception system according to an embodiment.

FIG. 18 illustrates a configuration example of a transmission/reception system 100 according to an embodiment. The transmission/reception system 100 includes a transmitter 200, a receiver 300, and a cable 400. The transmitter 200 is, for example, an AV source such as a personal computer, a game console, a disc player, a set top box, a digital camera, or a mobile phone. The receiver 300 is, for example, a television receiver, a projector, a head mounted display, or the like. The transmitter 200 and the receiver 300 are connected via the cable 400.

The transmitter 200 includes a light emitting unit 201, a receptacle 202, and an optical fiber 203 that propagates light from the light emitting unit 201 to the receptacle 202. The light emitting unit 201 includes a laser element such as a vertical cavity surface emitting laser (VCSEL) or a light emitting element such as a light emitting diode (LED). The light emitting unit 201 converts an electric signal (transmission signal) generated by a transmission circuit (not illustrated) into an optical signal. The optical signal emitted by the light emitting unit 201 is propagated to the receptacle 202 through the optical fiber 203.

Further, the receiver 300 includes a receptacle 301, a light receiving unit 302, and an optical fiber 303 that propagates light obtained by the receptacle 301 to the light receiving element 302. The light receiving unit 302 includes a light receiving element such as a photodiode. The light receiving unit 302 converts the optical signal transmitted from the receptacle 301 into an electric signal (reception signal) and supplies the electric signal to a reception circuit (not illustrated).

The cable 400 includes plugs 402 and 403 at one end and the other end of an optical fiber 401. The plug 402 at the one end of the optical fiber 401 is connected to the receptacle 202 of the transmitter 200, and the plug 403 at the other end of the optical fiber 401 is connected to the receptacle 301 of the receiver 300.

In this embodiment, the optical fiber 203 of the transmitter 200, the optical fiber 303 of the receiver 300, and the optical fiber 401 of the cable 400 propagate only the component of the fundamental mode at the first wavelength. Further, those optical fibers are configured so that wavelength dispersion becomes zero at the first wavelength. For example, the first wavelength is set to 1310 nm, the core diameter d and the numerical aperture NA are set to d=8 μm and NA=0.1, respectively, which are general parameters of a 1310 nm optical fiber, and the normalized frequency is set to V=1.92.

Therefore, those optical fibers function as single mode fibers at the wavelength of 1310 nm (see FIG. 3).

Further, in this embodiment, communication is performed by using light having the second wavelength and having the components of the fundamental mode and the first order mode. Herein, the second wavelength is a wavelength at which each of the above-described optical fibers can propagate not only the fundamental mode but also the first order mode. Specifically, for example, the second wavelength is set to 850 nm. In a case where light of 850 nm is used, the normalized frequency is V=2.96, and thus those optical fibers can propagate the first order mode in addition to the fundamental mode, that is, function as double mode fibers (see FIG. 4).

In the transmitter 200, light of 850 nm emitted from the light emitting element 201 is propagated to the receptacle 202 by the optical fiber 203 that is a 1310 nm single mode fiber. In this case, the light propagating through the optical fiber 203 is light having the components of the fundamental mode and the first order mode (see FIGS. 9(b) and 16).

Further, in this embodiment, a light intensity distribution at an output end surface of the optical fiber 203 is configured not to deviate in one direction from the center of a core. That is, the light intensity distribution at the output end surface of the optical fiber 203 is configured to be a light intensity distribution corresponding to the intermediate position between the first position where a high intensity portion is in one direction and the second position where a high intensity portion is in another direction opposite to the one direction (see the light intensity distribution at the position P2 in FIG. 16(a)).

Figure 19:
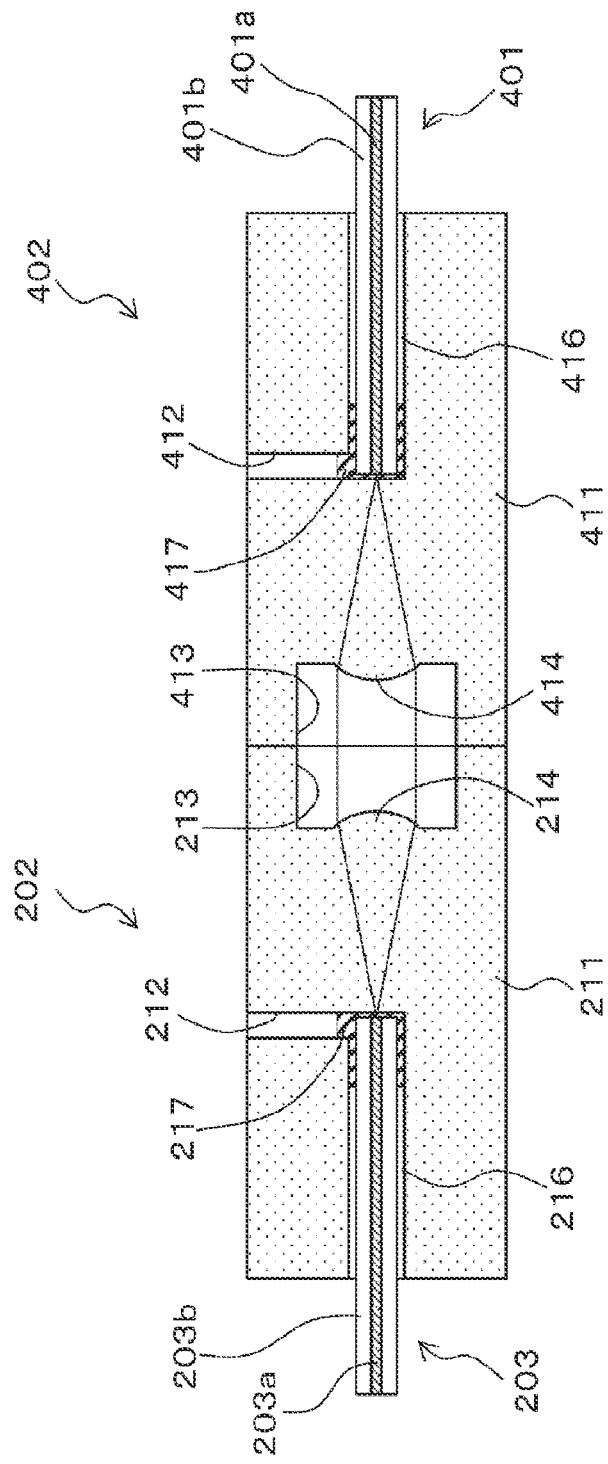
FIG. 19 is a cross-sectional view illustrating a state in which a receptacle of a transmitter and a plug of a cable are connected.

FIG. 19 is a cross-sectional view illustrating a state in which the receptacle 202 of the transmitter 200 and the plug 402 of the cable 400 are connected.

The receptacle 202 includes a receptacle main body 211. The receptacle main body 211 is made from, for example, a light transmitting material such as synthetic resin or glass or a material that transmits a specific wavelength such as silicon and is configured as a lensed ferrule. Because the receptacle main body 211 is configured as a lensed ferrule as described above, it possible to easily perform optical axis alignment of the optical fiber and the lens.

The receptacle main body 211 has a recessed light emitting portion (light transmission space) 213 on a front surface thereof. Further, a lens (convex lens) 214 is integrally formed with the receptacle main body 211 so as to be positioned at a bottom portion of the light emitting portion 213. Furthermore, the receptacle main body 211 has an optical fiber insertion hole 216 extending forward from a back surface side. The optical fiber 203 has a double structure of a core 203a at a central portion serving as an optical path and a cladding 203b covering the core.

The optical fiber insertion hole 216 is formed so that the core 203a of the optical fiber 203 inserted thereinto and an optical axis of the lens 214 are aligned. Further, the optical fiber insertion hole 216 is formed so that a bottom position thereof, that is, an abutting position of a tip end (emitting end) of the optical fiber 203 at the time of inserting the optical fiber 203 matches a focal position of the lens 214.

Further, the receptacle main body 211 has an adhesive injection hole 212 extending downward from an upper surface thereof so that the adhesive injection hole 212 communicates with a portion near the bottom position of the optical fiber insertion hole 216. After the optical fiber 203 is inserted into the optical fiber insertion hole 216, an adhesive 217 is injected through the adhesive injection hole 212 to the periphery of the optical fiber 203. Thus, the optical fiber 203 is fixed to the receptacle main body 211.

In the receptacle 202, the lens 214 has a function of forming light emitted from the optical fiber 203 into collimated light and emitting the collimated light. Therefore, the light emitted from the emitting end of the optical fiber 203 at a predetermined NA is incident on the lens 214, is formed into collimated light, and is emitted.

The plug 402 includes a plug main body 411. The plug main body 411 is made from, for example, a light transmitting material such as synthetic resin or glass or a material that transmits a specific wavelength such as silicon and is configured as a lensed ferrule.

The plug main body 411 has a recessed light incident portion (light transmission space) 413 on a front surface thereof. Further, a lens (convex lens) 414 is integrally formed with the plug main body 411 so as to be positioned at a bottom portion of the light incident portion 413. Furthermore, the plug main body 411 has an optical fiber insertion hole 416 extending forward from a back surface side. The optical fiber 401 has a double structure of a core 401a at a central portion serving as an optical path and a cladding 401b covering the core.

The optical fiber insertion hole 416 is formed so thou the core 401a of the optical fiber 401 inserted thereinto and an optical axis of the lens 414 are aligned. Further, the optical fiber insertion hole 416 is formed so that a bottom position thereof, that is, an abutting position of a tip end (incident end) of the optical fiber 401 at the time of inserting the optical fiber 401 matches a focal position of the lens 414.

Further, the plug main body 411 has an adhesive injection hole 412 extending downward from an upper surface thereof so that the adhesive injection hole 412 communicates with a portion near the bottom position of the optical fiber insertion hole 416. After the optical fiber 401 is inserted into the optical fiber insertion hole 416, an adhesive 417 is injected through the adhesive injection hole 412 to the periphery of the optical fiber 401. Thus, the optical fiber 401 is fixed to the plug main body 411.

In the plug 402 of the cable 400, the lens 414 has a function of condensing incident collimated light. In this case, the collimated light is incident on the lens 414 and is condensed, and the condensed light is incident on the incident end of the optical fiber 401.

Note that, although not described in detail, the plug 403 of the cable 400 and the receptacle 301 of the receiver 300 are configured in a similar manner to the configuration example of the receptacle 202 of the transmitter 200 and the plug 402 of the cable 400 described above.

Figure 20:
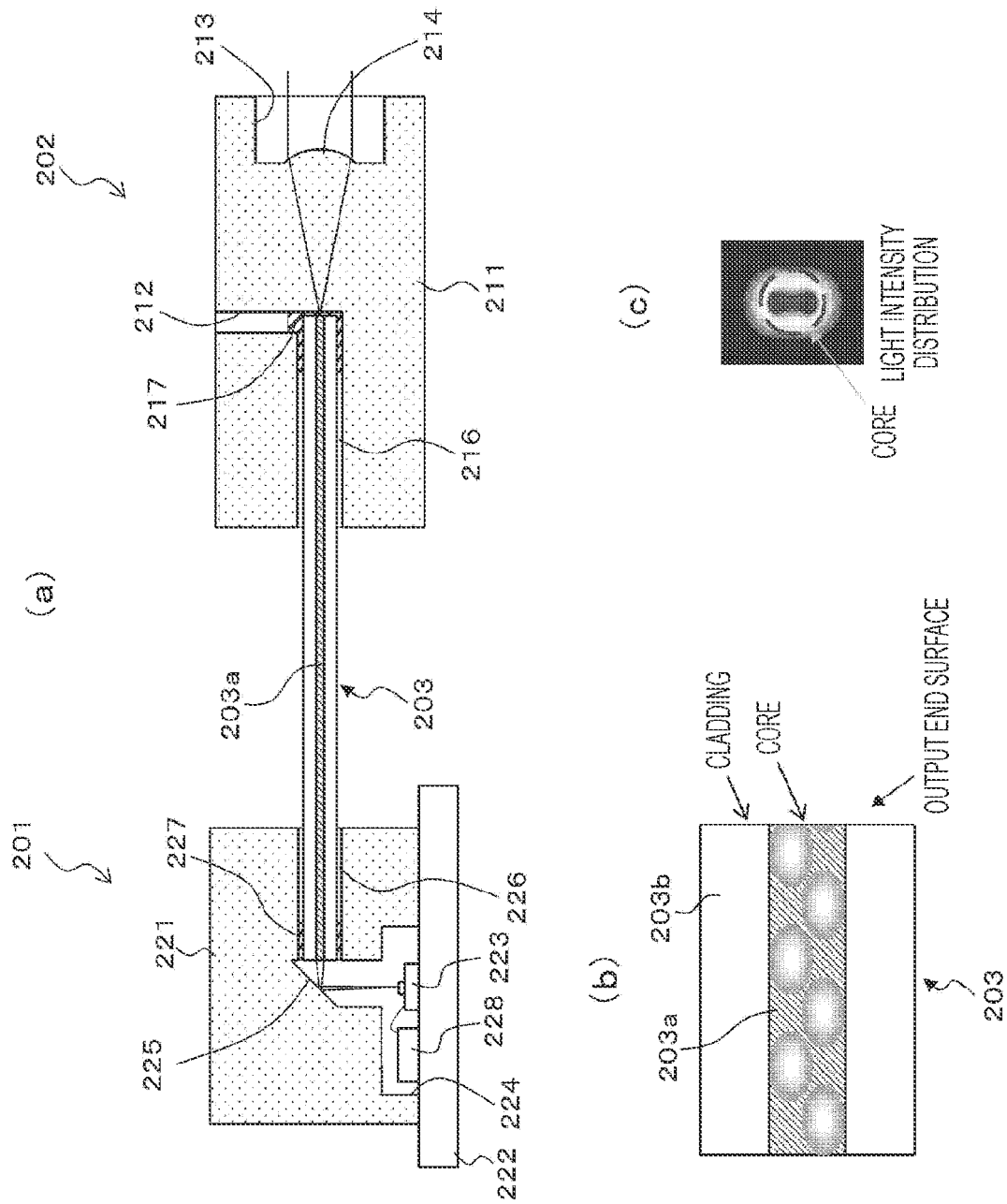
FIG. 20 is a cross-sectional view and the like illustrating a configuration example of a light emitting unit and a receptacle in a transmitter.

FIG. 20(a) illustrates a configuration example of the light emitting unit 201 and the receptacle 202 in the transmitter 200. This configuration example is merely an example, and the configuration of the transmitter 200 is not limited thereto.

The light emitting unit 201 includes a ferrule 221. The ferrule 221 is made from, for example, a light transmitting material such as synthetic resin or glass or a material that transmits a specific wavelength such as silicon.

The ferrule 221 has an optical fiber insertion hole 226 extending backward from a front surface side. The optical fiber 203 is inserted into the optical fiber insertion hole 226 and is then fixed to the ferrule 221 by an adhesive 227.

Further, a substrate 222 on which a light emitting element 223 and a light emitting element driving driver 228 are placed is fixed to a lower surface of the ferrule 221. In this case, the light emitting element 223 is placed on the substrate 222 so as to be aligned with each optical fiber 203.

Herein, a position of the substrate 222 is adjusted so that an emitting portion of the light emitting element 223 is aligned with the optical axis of the optical fiber 203, and then the substrate 222 is fixed.

Further, the ferrule 221 has an arrangement hole 224 extending upward from a lower surface side. Then, in order to change a direction of an optical path of light from the light emitting element 223 toward the optical fiber 203, a bottom portion of the arrangement hole 224 has an inclined surface, and a mirror (optical path changing portion) 225 is arranged on the inclined surface. Note that, regarding the mirror 225, a separately formed mirror may be fixed to the inclined surface, or a mirror may be formed on the inclined surface by vapor deposition or the like. Herein, the light emitting element 223 and the optical fiber 203 form an optical module.

The receptacle 202 is similar to that described above with reference to FIG. 19, and thus description thereof is herein omitted.

FIG. 20(b) schematically illustrates a light intensity distribution obtained in a case where light having the components of the fundamental mode and the first order mode is transmitted through the optical fiber 203 (see FIG. 16(a)). FIG. 20(c) illustrates a light intensity distribution at the output end surface, that is, an emitting end surface of the optical fiber 203. The light intensity distribution at the output end surface of the optical fiber is configured not to deviate in one direction from the center of the core 203a. That is, the light intensity distribution at the output end surface of the optical fiber 203 is configured to be a light intensity distribution corresponding to the intermediate position between the first position where a high intensity portion is in one direction and the second position where a high intensity portion is in another direction opposite to the one direction (see FIG. 16(c)).

As described above, in the transmission/reception system 100 of FIG. 18, light propagating through the optical fiber 203 of the transmitter 200 is light having the components of the fundamental mode and the first order mode, and the light intensity distribution at the output end surface of the optical fiber 203 is a light intensity distribution corresponding to the intermediate position between the first position where a high intensity portion is in one direction and the second position where a high intensity portion is in another direction. Therefore, in a case of propagating light having the components of the fundamental mode and the first order mode, it is possible to obtain favorable coupling efficiency regardless of the direction of the optical axis deviation, as in a case of propagating light having only the component of the fundamental mode. Therefore, it becomes unnecessary to use an additional component or a light source having a complicated structure so as to propagate light having only the component of the fundamental mode. This makes it possible to reduce a component cost.

[Optical Module Adjustment Device]

An optical module adjustment device according to an embodiment will be described. The optical module adjustment device adjusts the light intensity distribution at the output end surface of the optical fiber 203 included in the optical module illustrated in FIG. 21(a) so that the light intensity distribution does not deviate in one direction from the center of the core as illustrated in FIG. 21(b). That is, the light intensity distribution at the output end surface of the optical fiber 203 is adjusted to be a light intensity distribution corresponding to an intermediate position between the first position P1 where a high intensity portion is in one direction and the second position P3 where a high intensity portion is in another direction opposite to the one direction (see the light intensity distribution at the position P2 in FIG. 16(a)). Note that, in FIG. 21(a), portions corresponding to those in FIG. 20(a) are denoted by the same reference signs.

FIG. 22(a) illustrates a configuration example of an optical module adjustment device 500. The optical module adjustment device 500 cuts the output end of the optical fiber 203, that is, changes a length of the optical fiber 203 to adjust the light intensity distribution at the output end surface.

The optical module adjustment device 500 includes an imaging element 501, a control circuit 502, a fixing plate 503, a cutter fixing arm 504, a cutter 505, an arm driving unit 506, and an optical fiber holder 507.

The fixing plate 503 fixes the arm driving unit 506 and the optical fiber holder 507. The optical fiber holder 507 fixes a tip end of the optical fiber 203. The arm driving unit 506 holds the cutter fixing arm 504 having a tip end side on which the cutter 505 is fixed, moves the cutter fixing arm 504 in an axial direction of the optical fiber 203 to adjust a cutting position, and moves the cutter fixing arm 504 in a radial direction of the optical fiber 203 to cut the output end of the optical fiber 203.

The imaging element 501 images an intensity of light at the output end surface of the optical fiber 203. The control circuit 502 analyzes captured image data obtained by the imaging element 501 and controls the arm driving unit 506 on the basis of the result to move the position of the cutter 505 and cut the output end of the optical fiber 203. Therefore, the light intensity distribution at the output end surface of the optical fiber 203 is adjusted not to deviate in one direction from the center of the core as illustrated in FIG. 22(b). That is, the light intensity distribution at the output end surface of the optical fiber 203 is adjusted to be a light intensity distribution corresponding to the intermediate position between the first position P1 where a high intensity portion is in one direction and the second position P3 where a high intensity portion is in another direction opposite to the one direction (see the light intensity distribution at the position P2 in FIG. 16(a)).

Figure 23:
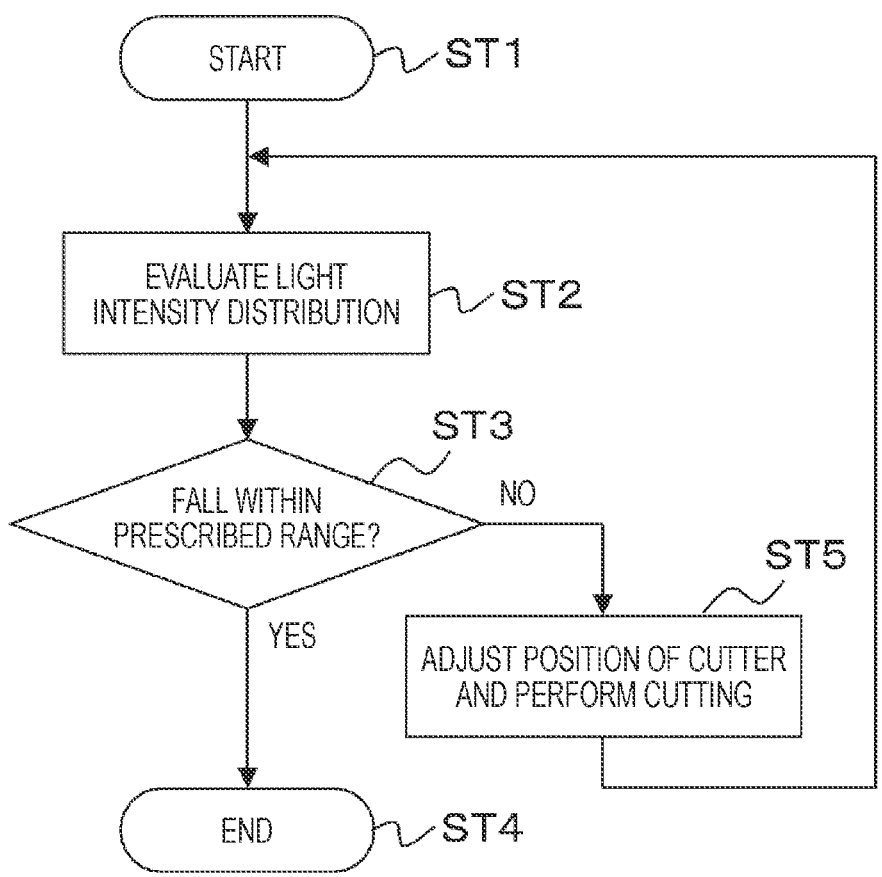
FIG. 23 is a flowchart showing an example of a procedure of processing of controlling a control circuit.

FIG. 23 is a flowchart showing an example of a procedure of processing or controlling the control circuit 502. In step ST1, the control circuit 502 starts the processing. Next, in step ST2, the control circuit 502 analyzes captured image data obtained by the imaging element 501 and evaluates a light intensity distribution at the output end surface of the optical fiber 203.

Next, in step ST3, the control circuit 502 determines whether or not the light intensity distribution at the output end surface of the optical fiber 203 falls within a prescribed range (held as a table) determined in advance. When the light intensity distribution falls within the prescribed range, the control circuit 502 terminates the processing in step ST4. That is, at this time, the output end of the optical fiber 203 is not cut.

Meanwhile, when the light intensity distribution does not fall within the prescribed range in step ST3, the control circuit 502 adjusts the position of the cutter 505 and cuts the output end of the optical further 203 in step ST5. Then, after the processing in step ST5, the control circuit 502 returns to the processing in step ST2 and repeats similar processing to the above until the light intensity distribution at the output end surface of the optical fiber 203 falls within the prescribed range.

Herein, the prescribed range corresponds to the position P2 that is the intermediate position between the first position P1 where a high intensity portion is in one direction and the second position P3 where a high intensity portion is in another direction opposite to the one direction. The prescribed range may be (1) an error range of a certain percentage from a shape of the ideal light intensity distribution in FIG. 16(c) or (2) may be determined by cutting the optical fiber 203 several times to grasp a characteristic of the light intensity distribution and appropriately searching for a point where the intensity distribution does not deviate.

Figure 24:
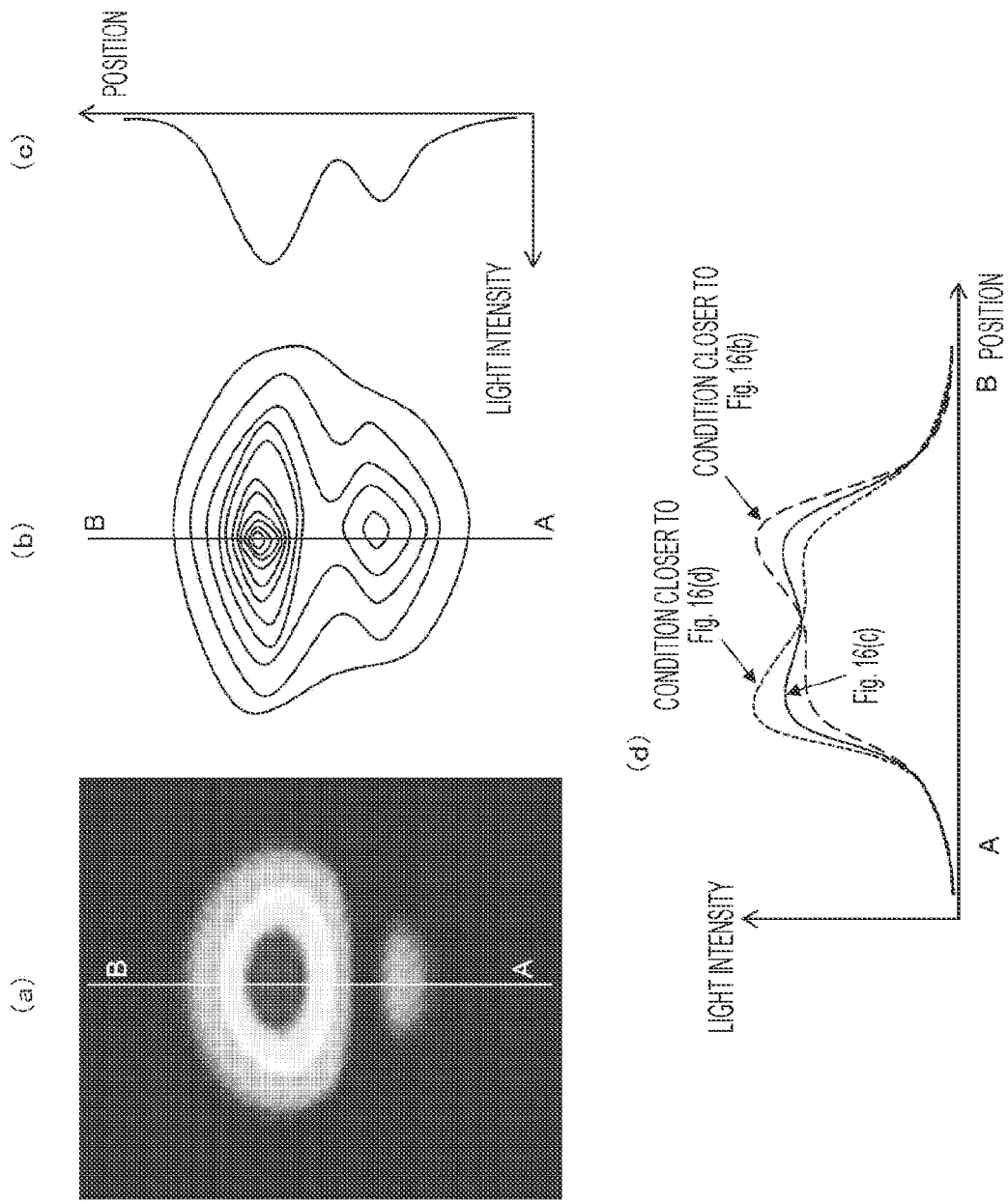
FIG. 24 is explanatory diagrams for measurement and the like of a light intensity distribution.

In the case of (1), the shape of the light intensity distribution defined as falling within the prescribed range under the condition closer to FIG. 16(b) is different from that under the condition closer to FIG. 16(d). As illustrated in FIGS. 24(a) to 24(c), the light intensity distribution is measured by using the technology (WO 2018/131700 A) proposed by the present applicants. FIG. 24(a) illustrates an example of the light intensity distribution (example of the captured image). FIG. 24(b) schematically illustrates the example of the light intensity distribution in FIG. 24(a) with contour lines. FIG. 24(c) illustrates a light intensity along a line A-B of FIG. 24(b). Then, as illustrated in FIG. 24(d), the light intensity distribution may be determined as falling within the prescribed range in a case where the shape thereof falls within a range under the condition closer co FIG. 16(b) and a range under the condition closer to FIG. 16(d) with respect to FIG. 16(c).

Figure 25:
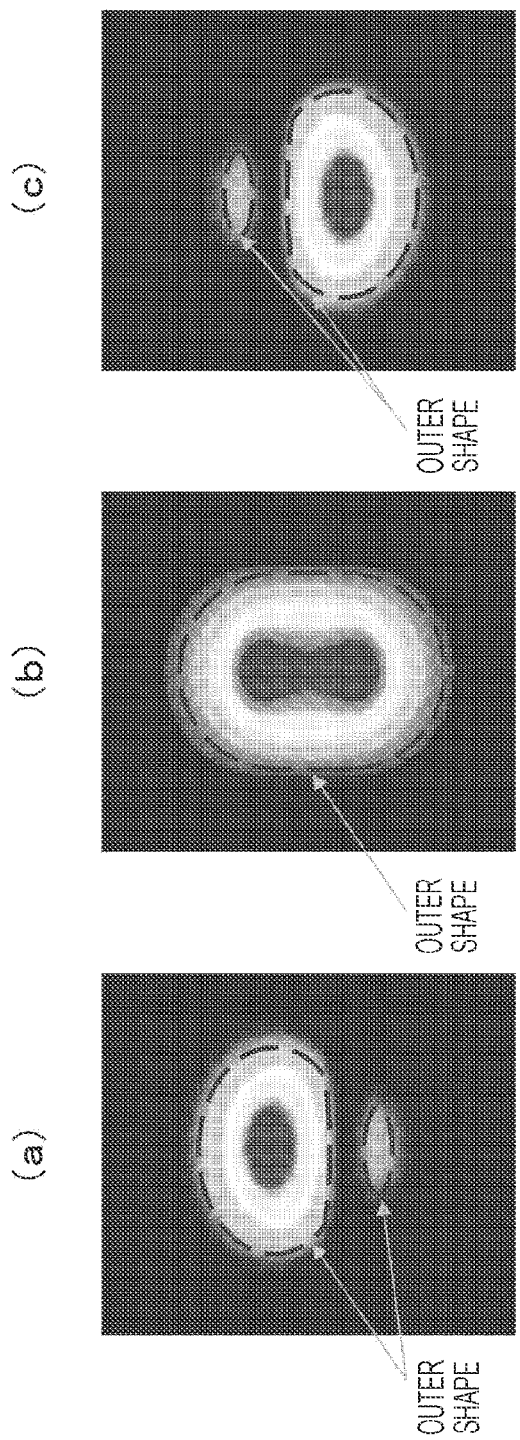
FIG. 25 is explanatory diagrams for calculation and the like of an outer shape of a light intensity distribution.

Further, an outer shape of the light intensity distribution may be calculated by using the technology (WO 2018/131700 A) proposed by the present applicants, and, in a case where the outer shape falls within the prescribed range, the light intensity distribution may be determined as falling within the prescribed range. FIGS. 25(a) to 25(c) illustrate the same light intensity distributions as FIGS. 16(b) to 16(d), respectively. In FIGS. 25(a) to 25(c), each broken line indicates an outer shape calculated in each light intensity distribution. In a case where the outer shape fails within a range of a state slightly closer to the state (a) from the ideal state (b) and a state slightly closer to the state (c) therefrom, the light intensity distribution may be determined as falling within the prescribed range.

Figure 26:
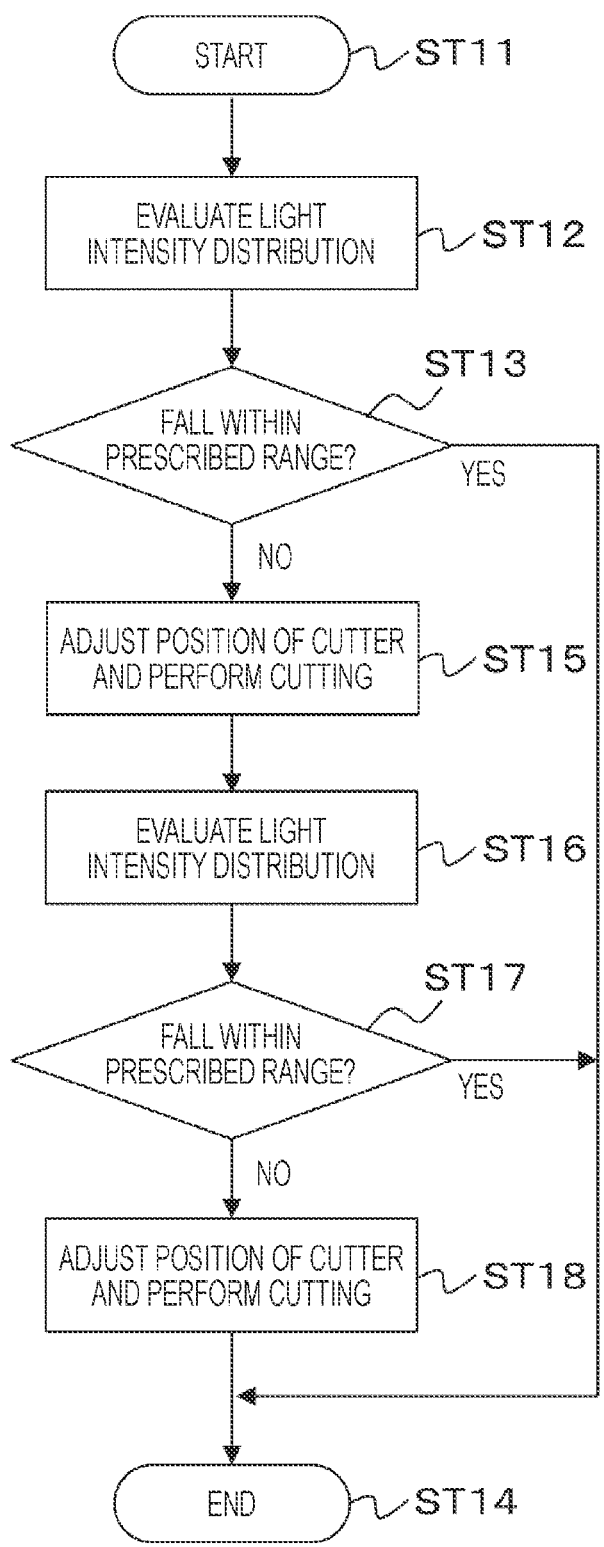
FIG. 26 is a flowchart showing another example of a procedure of processing of controlling a control circuit.

FIG. 26 is a flowchart showing another example of a procedure of processing of controlling the control circuit 502. In step ST11, the control circuit 502 starts the processing. Next, in step ST12, the control circuit 502 analyzes captured image data obtained by the imaging element 501 and evaluates a light intensity distribution at the output end surface of the optical fiber 203.

Next, in step ST3, the control circuit 502 determines whether or not the light intensity distribution at the output end surface of the optical fiber 203 falls within a prescribed range (held as a table) determined in advance. When the light intensity distribution falls within the prescribed range, the control circuit 502 terminates the processing in step ST14. That is, at this time, the output end of the optical fiber 203 is not cut.

Meanwhile, when the light intensity distribution does not fall within the prescribed range in step ST13, the control circuit 502 adjusts the position of the cutter 505 and cuts the output end of the optical fiber 203 in step ST5. In this case, the length to be cut is desirably about half the length between the position P1 and the position 92 in FIG. 16(a).

Next, in step ST16, the control circuit 502 analyzes captured image data obtained by the imaging element 501 and evaluates a light intensity distribution at the output end surface of the optical fiber 203. Next, in step ST17, the control circuit 502 determines whether or not the light intensity distribution at the output end surface of the optical fiber 203 falls within the prescribed range. When the light intensity distribution falls within the prescribed range, the control circuit 502 terminates the processing in step ST14.

Meanwhile, when the light intensity distribution does not fall within the prescribed range in step ST17, the control circuit 502 adjusts the position of the cutter 505 and cuts the output end of the optical fiber 203 in step ST18. The length to be cut in this case will be described.

Figure 27:
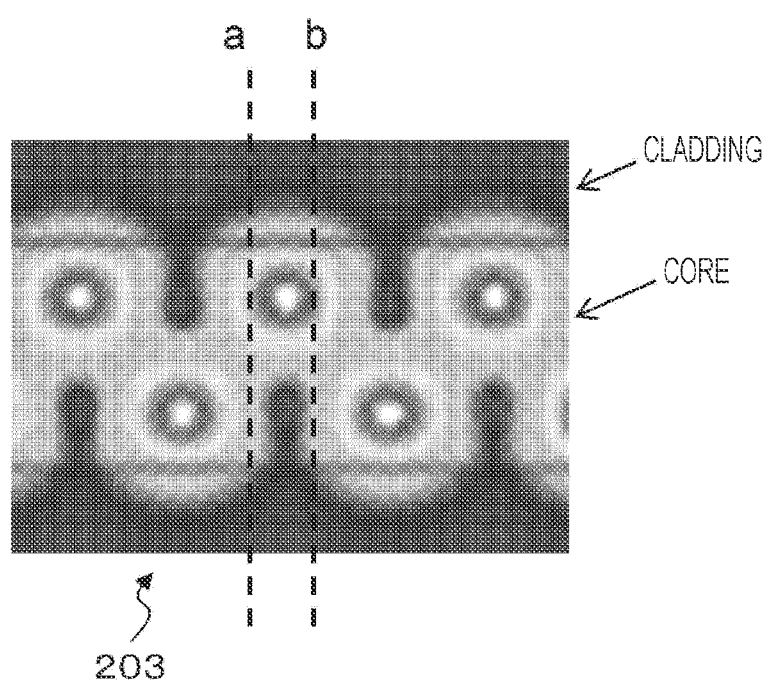
FIG. 27 is an explanatory diagram of a length to be cut.

Assuming that the light intensity distribution before cutting is, for example, a light intensity distribution at a position indicated by a broken line a of FIG. 27, the light intensity distribution is similar to a light intensity distribution at a position indicated by a broken line b of FIG. 27. Therefore, the control circuit 502 cannot grasp whether the output end of the optical fiber 203 is at the position indicated by the broken line a or the position indicated by the broken line b in the first intensity distribution measurement. However, in a case where a period of separation of the light intensity distribution is known, it is possible to grasp which position in the period of the light intensity distribution the current light intensity distribution at the output end of the optical fiber 203 corresponds to by monitoring the light intensity distribution after the first cutting.

As described above, the control circuit 502 can find which position in the period of the light intensity distribution the current light intensity distribution at the output end of the optical fiber 203 corresponds to, and therefore it is possible to obtain the optimum length to be cut to achieve the light intensity distribution in FIG. 16(c). When the output end of the optical fiber 203 is cut in step ST18 as described above, the light intensity distribution at the output end falls within the prescribed range.

After the processing in step ST18, the control circuit 502 terminates the processing in step ST14.

A period T of separation of the light intensity distribution is different for each wavelength. FIG. 28(a), as well as FIG. 16(a), is a simulation diagram of a light intensity distribution obtained in a case where light having the components of the fundamental mode and the first order mode is transmitted through the optical fiber. FIG. 28(b) is a graph showing a relationship between wavelength [nm] and period [μm].

It can be seen from the graph that the period T is longer as the wavelength is shorter and the period T is shorter as the wavelength is closer to about 900 nm. Further, in a case where the wavelength is 900 nm or more, a relationship of a double mode between the optical fiber of 1310 nm and the light of 850 nm collapses, and therefore the period tends to increase. Therefore, the control circuit needs to determine an amount of cutting the optical fiber in accordance with the period corresponding to the wavelength.

Figure 22:
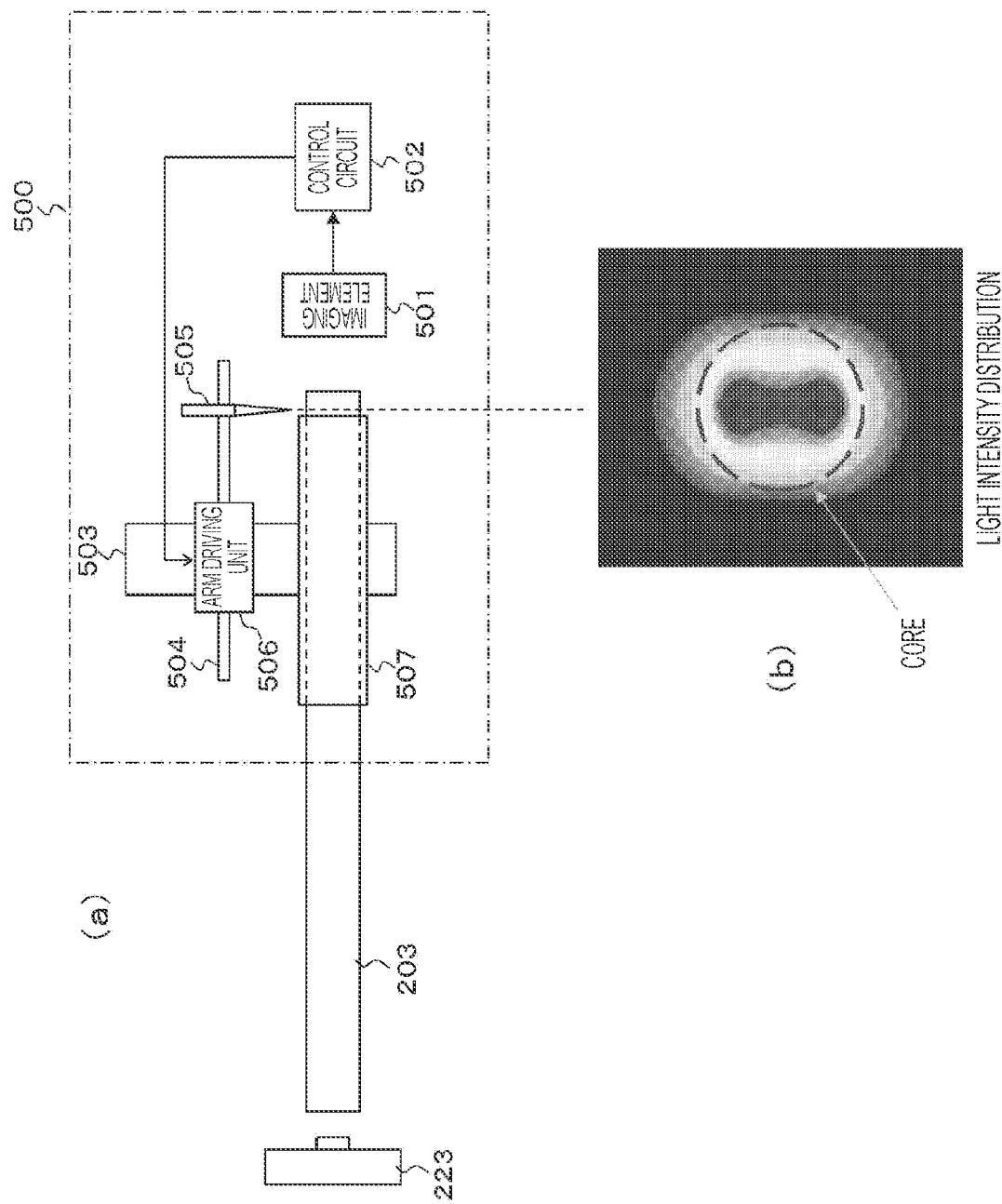
FIG. 22 illustrates a configuration example of an optical module adjustment device.

Note that, in the optical module adjustment deice 500 of FIG. 22, the arm driving unit 506 moves the cutter fixing arm 504 in the axial direction of the optical fiber 203 to adjust the cutting position. However, the cutter 505 may be fixed and the optical fiber holder 507 may be moved to adjust the cutting position, or the optical fiber 203 fixed to the optical fiber holder 507 may be moved to adjust the cutting position. Further, the output end may not be cut, and, instead, the output end surface of the optical fiber 203 may be polished.

Further, the optical module adjustment device 500 illustrated in FIG. 22 is an example of changing the length of the optical fiber 203 to adjust the light intensity distribution at the output end surface. However, as a method of adjusting the light intensity distribution at the output end surface of the optical fiber 203, there is also a method of changing an emission wavelength of the light emitting element 223. The period T of separation of the light intensity distribution is changed by changing the emission wavelength (see the graph in FIG. 28(b)), and thus it is possible to adjust the light intensity distribution at the output end surface of the optical fiber 203.

Figure 29:
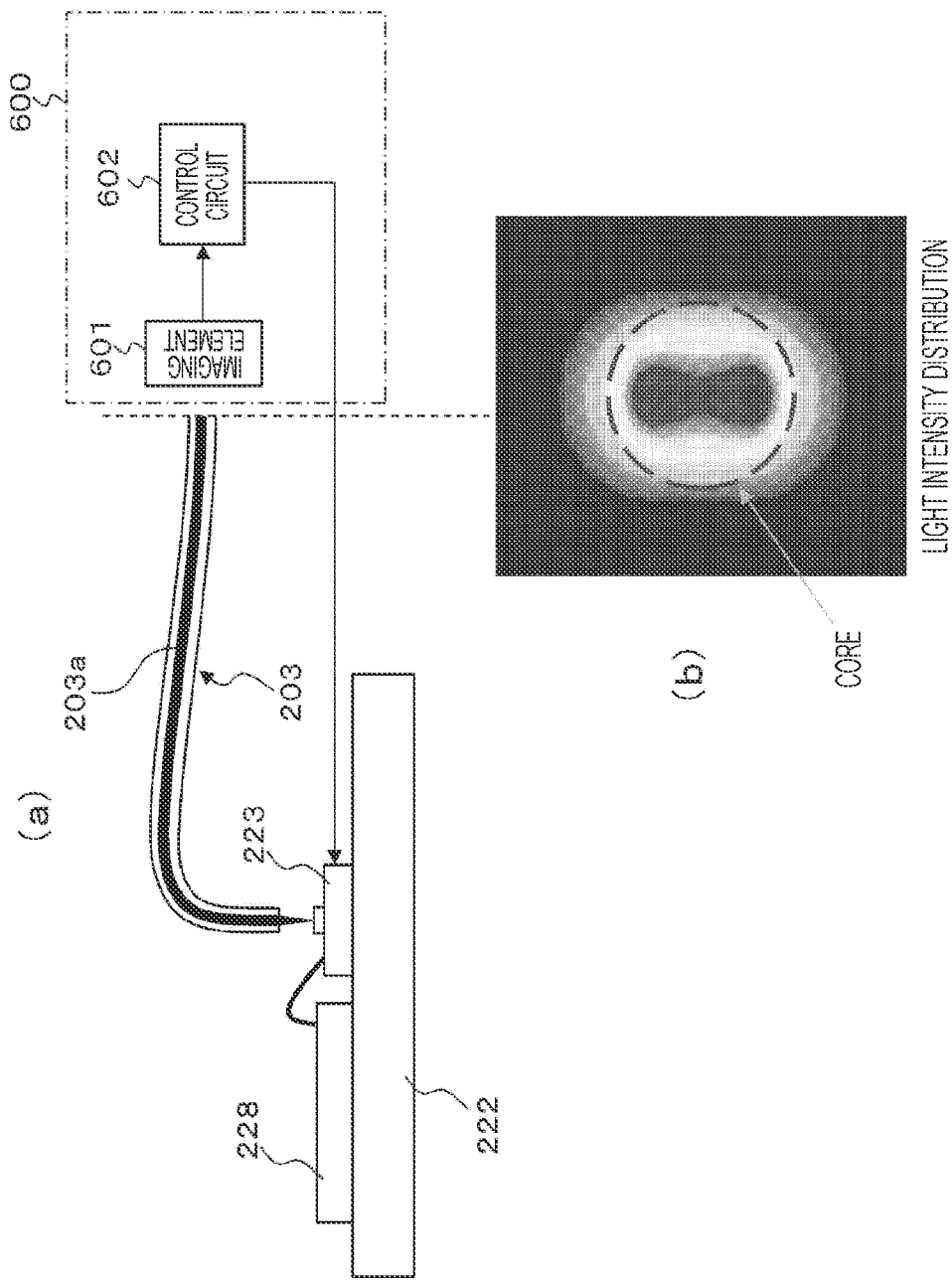
FIG. 29 illustrates another configuration example of an optical module adjustment device.

FIG. 29 illustrates a configuration example of an optical module adjustment device 600 that adopts a method of changing the emission wavelength of the light emitting element 223. The optical module adjustment device 600 includes an imaging element 601 and a control circuit 602.

The imaging element 601 images an intensity of light at the output end surface of the optical fiber 203. The control circuit 602 analyzes captured image data obtained by the imaging element 601 and changes the emission wavelength of the light emitting element 223 on the basis of the result. Therefore, the light intensity distribution at the output end surface of the optical fiber 203 is adjusted not to deviate one direction from the center of the core as illustrated in FIG. 29(b). That is, the light intensity distribution at the output end surface of the optical fiber 203 is adjusted to be a light intensity distribution corresponding to the intermediate position between the first position P1 where a high intensity portion is in one direction and the second position 93 where a high intensity portion is in another direction opposite to the one direction (see the light intensity distribution at the position P2 in FIG. 16(a)).

2. Modification Examples

Note that, in the above-described embodiment, the present technology is applied to the transmitter 200 of the transmission/reception system 100 (see FIG. 18) and optimizes the light intensity distribution at the output end of the optical fiber 203 of the receptacle 202.

Figure 30:
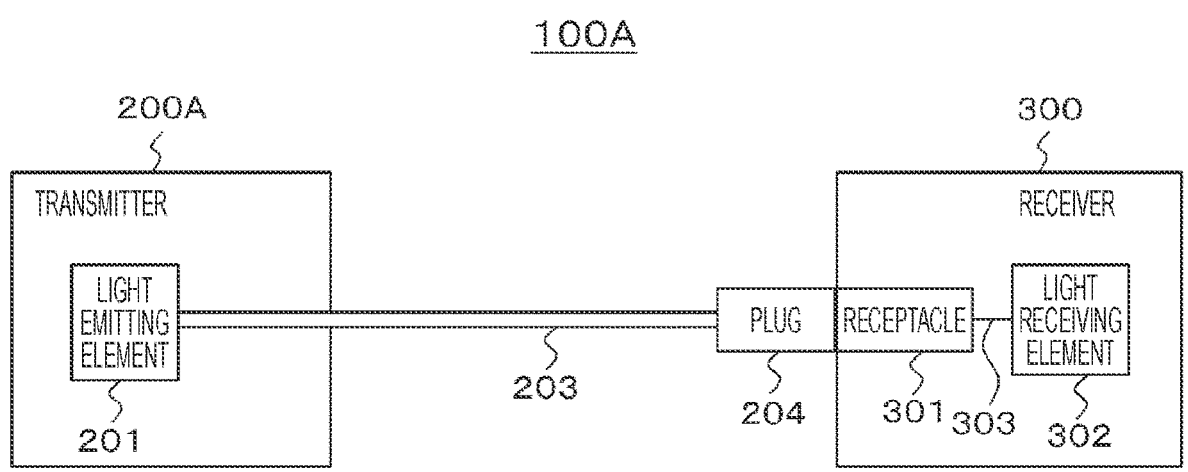
FIG. 30 is a block diagram illustrating a transmission/reception system to which the present technology is applicable.

The present technology is also similarly applicable to a transmission/reception system 100A illustrated in FIG. 30. In the transmission/reception system 100A, portions corresponding to the portions of the transmission/reception system 100 in FIG. 18 are denoted by the same reference signs, and detailed description thereof will be appropriately omitted.

The transmission/reception system 100A includes a transmitter 200A and a receiver 300. The transmitter 200A includes a light emitting element 201, and a plug 204 protrudes as a pick tail. In this case, light from the light emitting element 201 is propagated to the plug 204 through the optical fiber 203. The plug 204 is connected to the receptacle 301 of the receiver 300.

The present technology is also similarly applicable to the transmitter 200A of the transmission/reception system 100A and can optimize the light intensity distribution at the output end of the optical fiber 203 of the plug 204.

Figure 31:
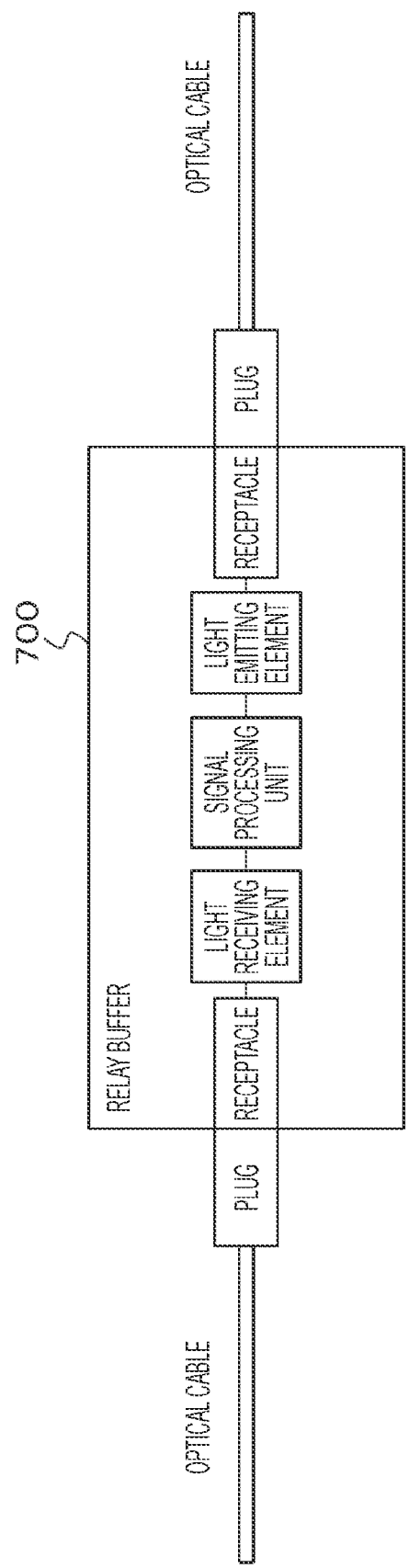
FIG. 31 is a block diagram illustrating a relay buffer to which the present technology is applicable.

Further, the present technology is also similarly applicable to a relay buffer 700 illustrated in FIG. 31 and can optimize a light intensity distribution at an output end of an optical fiber of a receptacle on an output side.

Further, in the above-described embodiment, the method of adjusting a light intensity distribution at an output end surface of an optical fiber has been described by using one optical fiber. However, a plurality of optical fibers may be arranged in parallel and may be simultaneously processed in parallel.

Further, the case where the first wavelength is 1310 nm has been described in the above-described embodiment. However, the first wavelength may fall within a range from, for example, 300 nm to 5 μm because a possible light source to be used is a laser light source or an LED light source.

Further, the case where the first wavelength is 1310 nm has been described in the above-described embodiment. However, the first wavelength may be a wavelength in a 1310 nm band including 1310 nm. Furthermore, the case where the first wavelength is 1310 nm has been described in the above-described embodiment. However, the first wavelength may be 1550 nm or may also be a wavelength in a 1550 nm band including 1550 nm. Still further, the case where the second wavelength is 850 nm has been described. However, the second wavelength may be a wavelength in an 850 nm band including 850 nm.

Further, an example where an optical waveguide is an optical fiber has been described in the above-described embodiment. However, as a matter of course, the present technology is also applicable to an optical waveguide other than the optical fiber, such as, for example, a silicon optical waveguide.

Hereinabove, the preferred embodiment of the present disclosure has been described in detail with reference to the accompanying drawings. However, the technical scope of the present disclosure is not limited to such examples. It is obvious that a person having ordinary knowledge in the technical field of the present disclosure can come up with various changes or modifications within the scope of the technical idea described in the claims. As a matter of course, it is understood that those changes and modifications also belong to the technical scope of the present disclosure.

Further, the effects described in this specification are merely illustrative or exemplary and are not limited. In other words, the technology according to the present disclosure can have other effects that are apparent to those skilled in the art from the description of the present specification in addition to or in place of the above effects.

Note that the present technology may also have the following configurations.

(1) An optical module including:
a light emitting element; and
an optical waveguide that propagates light from the light emitting element, in which:
the light propagating through the optical waveguide is light having components of a fundamental mode and a first order mode;
the light having the components of the fundamental mode and the first order mode propagates through the optical waveguide while having a light intensity distribution in which high intensity portions alternately appear in one direction and another direction opposite to the one direction with respect to the center of a core along the optical waveguide; and
a light intensity distribution at an output end surface of the optical waveguide is a light intensity distribution corresponding to an intermediate position between a first position where the high intensity portion is in the one direction and a second position where the high intensity portion is in the another direction.

(2) The optical module according to (1), in which:
the optical waveguide propagates only the component of the fundamental mode at a first wavelength; and
the light propagating through the optical waveguide has a second wavelength at which the optical waveguide can propagate the components of the fundamental mode and the first order mode.

(3) The optical module according to (2), in which:
the first wavelength is a wavelength in a 1310 nm band or a 1550 nm band; and
the second wavelength is a wavelength in an 850 nm band.

(4) The optical module according to any one of (1) to (3), in which
the optical waveguide is an optical fiber.
(5) The optical module according to any one of (1) to (3), in which
the optical waveguide is a silicon optical waveguide.
(6) An adjustment device including
an adjustment unit that adjusts a light intensity distribution at an output end surface of an optical waveguide
in an optical module including
a light emitting element, and
the optical waveguide that propagates light from the light emitting element, in which
the light propagating through the optical waveguide is light having components of a fundamental mode and a first order mode, and
the light having the components of the fundamental mode and the first order mode propagates through the optical waveguide while having a light intensity distribution in which high intensity portions alternately appear in one direction and another direction opposite to the one direction with respect to the center of a core along the optical waveguide,
in which
the adjustment unit makes an adjustment so that the light intensity distribution at the output end surface of the optical waveguide becomes a light intensity distribution corresponding to an intermediate position between a first position where the high intensity portion is in the one direction and a second position where the high intensity portion is in the another direction.
(7) The adjustment device according to (6), further including
an acquisition unit that acquires information regarding the light intensity distribution at the output end surface of the optical waveguide, in which
the adjustment unit makes the adjustment on the basis of the acquired information regarding the light intensity distribution.
(8) The adjustment device according to (7), in which
the adjustment unit makes the adjustment by changing a length of the optical waveguide.
(9) The adjustment device according to (8), in which
the adjustment unit cuts or polishes an output end of the optical waveguide in units of a predetermined length until the light intensity distribution at the output end surface of the optical waveguide becomes the light intensity distribution corresponding to the intermediate position between the first position and the second position.
(10) The adjustment device according to (8), in which
the adjustment unit calculates a length to be shortened in order that the light intensity distribution at the output end surface of the optical waveguide becomes the light intensity distribution corresponding to the intermediate position between the first position and the second position on the basis of the information regarding the light intensity distribution acquired before the length is shortened and the information regarding the light intensity distribution acquired when the length is shortened by a predetermined length and further shortens the length by the calculated length.
(11) The adjustment device according to (7), in which
the adjustment unit makes the adjustment by changing an emission wavelength of the light emitting element.

(12) An adjustment method including an adjustment step of adjusting a light intensity distribution at an output end surface of an optical waveguide
in an optical module including
a light emitting element, and
the optical waveguide that propagates light from the light emitting element, in which
the light propagating through the optical waveguide is light having components of a fundamental mode and a first order mode, and
the light having the components of the fundamental mode and the first order mode propagates through the optical waveguide while having a light intensity distribution in which high intensity portions alternately appear in one direction and another direction opposite to the one direction with respect to the center of a core along the optical waveguide,
in which
in the adjustment step, the light intensity distribution at the output end surface of the optical waveguide is adjusted to become a light intensity distribution corresponding to an intermediate position between a first position where the high intensity portion is in the one direction and a second position where the high intensity portion is in the another direction.
(13) An optical module including:
a light emitting element;
an optical waveguide that propagates light from the light emitting element, in which:
the light propagating through the optical waveguide is light having components of a fundamental mode and a first order mode;
the light having the components of the fundamental mode and the first order mode propagates through the optical waveguide while having a light intensity distribution in which high intensity portions alternately appear in one direction and another direction opposite to the one direction with respect to the center of a core along the optical waveguide; and
a light intensity distribution at an output end surface of the optical waveguide is configured not to deviate in one direction from the center of the core.

REFERENCE SIGNS LIST 100, 100A Transmission/reception system
200, 200A Transmitter
201 Light emitting unit
202 Receptacle
203 Optical fiber
203a Core
203b Cladding
204 Plug
211 Connector main body
212 Adhesive injection hole
213 Light emitting portion (light transmission space)
214 Lens (convex lens)
216 Optical fiber insertion hole
217 Adhesive
221 Ferrule
222 Substrate
223 Light emitting element
224 Arrangement hole
225 Mirror
226 Optical fiber insertion hole
227 Adhesive
228 Light emitting element driving driver 300 Receiver
301 Receptacle
302 Light receiving unit
303 Optical fiber
400 Cable
401 Optical fiber
401a Core
401b Cladding
402, 403 Plug
411 Connector main body
412 Adhesive injection hole
413 Light incident portion (light transmission space)
414 Lens (convex lens)
416 Optical fiber insertion hole
417 Adhesive
500 Optical module adjustment device
501 Imaging element
502 Control circuit
503 Fixing plate
504 Cutter fixing arm
505 Cutter
506 Arm driving unit
507 Optical fiber holder
600 Optical module adjustment device
601 Imaging element
602 Control circuit

The invention claimed is:

1. An optical module comprising:
a light emitting element; and
an optical waveguide configured to propagate light from the light emitting element,
wherein the light propagating through the optical waveguide is light having components of a fundamental mode and a first order mode,
wherein the light having the components of the fundamental mode and the first order mode propagates through the optical waveguide while having a light intensity distribution in which high intensity portions alternately appear in one direction and another direction opposite to the one direction with respect to the center of a core along the optical waveguide,
wherein a light intensity distribution at an output end surface of the optical waveguide is a light intensity distribution corresponding to an intermediate position between a first position where the high intensity portion is in the one direction and a second position where the high intensity portion is in the another direction, and
wherein the optical waveguide propagates only a component of the fundamental mode at a first wavelength.

2. The optical module according to claim 1, wherein the light propagating through the optical waveguide has a second wavelength at which the optical waveguide can propagate the components of the fundamental mode and the first order mode.

3. The optical module according to claim 2,
wherein the first wavelength is a wavelength in a 1310 nm band or a 1550 nm band, and
wherein the second wavelength is a wavelength in an 850 nm band.

4. The optical module according to claim 1,
wherein the optical waveguide is an optical fiber.

5. The optical module according to claim 1,
wherein the optical waveguide is a silicon optical waveguide.

6. An adjustment device comprising:
an adjustment unit configured to adjust a light intensity distribution at an output end surface of an optical waveguide in an optical module including
a light emitting element, and
the optical waveguide configured to propagate light from the light emitting element,
wherein the light propagating through the optical waveguide is light having components of a fundamental mode and a first order mode,
wherein the light having the components of the fundamental mode and the first order mode propagates through the optical waveguide while having a light intensity distribution in which high intensity portions alternately appear in one direction and another direction opposite to the one direction with respect to the center of a core along the optical waveguide, and
wherein the adjustment unit makes an adjustment so that the light intensity distribution at the output end surface of the optical waveguide becomes a light intensity distribution corresponding to an intermediate position between a first position where the high intensity portion is in the one direction and a second position where the high intensity portion is in the another direction.

7. The adjustment device according to claim 6, further comprising:
an acquisition unit configured to acquire information regarding the light intensity distribution at the output end surface of the optical waveguide,
wherein the adjustment unit makes the adjustment on a basis of the acquired information regarding the light intensity distribution, and
wherein the acquisition unit is implemented via at least one processor.

8. The adjustment device according to claim 7,
wherein the adjustment unit makes the adjustment by changing a length of the optical waveguide.

9. The adjustment device according to claim 8,
wherein the adjustment unit cuts or polishes an output end of the optical waveguide in units of a predetermined length until the light intensity distribution at the output end surface of the optical waveguide becomes the light intensity distribution corresponding to the intermediate position between the first position and the second position.

10. The adjustment device according to claim 8,
wherein the adjustment unit calculates a length to be shortened in order that the light intensity distribution at the output end surface of the optical waveguide becomes the light intensity distribution corresponding to the intermediate position between the first position and the second position on a basis of the information regarding the light intensity distribution acquired before the length is shortened and the information regarding the light intensity distribution acquired when the length is shortened by a predetermined length and further shortens the length by the calculated length.

11. The adjustment device according to claim 7,
wherein the adjustment unit makes the adjustment by changing an emission wavelength of the light emitting element.

12. An adjustment method comprising:
adjusting a light intensity distribution at an output end surface of an optical waveguide in an optical module including
a light emitting element, and
the optical waveguide configured to propagate light from the light emitting element,
wherein the light propagating through the optical waveguide is light having components of a fundamental mode and a first order mode,
wherein the light having the components of the fundamental mode and the first order mode propagates through the optical waveguide while having a light intensity distribution in which high intensity portions alternately appear in one direction and another direction opposite to the one direction with respect to the center of a core along the optical waveguide, and
wherein the light intensity distribution at the output end surface of the optical waveguide is adjusted in the adjusting to become a light intensity distribution corresponding to an intermediate position between a first position where the high intensity portion is in the one direction and a second position where the high intensity portion is in the another direction.

13. An optical module comprising:
an optical waveguide configured to propagate light from a light emitting element,
wherein the light propagating through the optical waveguide is light having components of a fundamental mode and a first order mode,
wherein the light having the components of the fundamental mode and the first order mode propagates through the optical waveguide while having a light intensity distribution in which high intensity portions alternately appear in one direction and another direction opposite to the one direction with respect to the center of a core along the optical waveguide,
wherein a light intensity distribution at an output end surface of the optical waveguide is configured not to deviate in one direction from the center of the core, and
wherein the optical waveguide propagates only a component of the fundamental mode at a first wavelength.

* * * * *